(12) United States Patent
Dykeman et al.

(10) Patent No.: US 9,009,794 B2
(45) Date of Patent: Apr. 14, 2015

(54) SYSTEMS AND METHODS FOR TEMPORARY ASSIGNMENT AND EXCHANGE OF DIGITAL ACCESS RIGHTS

(75) Inventors: Kim R. Dykeman, San Francisco, CA (US); Eric W. Grab, San Diego, CA (US); William J. Korbecki, Lake in the Hills, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 22 days.

(21) Appl. No.: 13/341,546

(22) Filed: Dec. 30, 2011

(65) Prior Publication Data

US 2013/0174223 A1 Jul. 4, 2013

(51) Int. Cl.
G06F 21/00 (2013.01)
G06F 21/10 (2013.01)

(52) U.S. Cl.
CPC ...................... G06F 21/10 (2013.01)

(58) Field of Classification Search
USPC ............................................................ 726/4
See application file for complete search history.

(56) References Cited

U.S. PATENT DOCUMENTS

| | | |
|---|---|---|
| 6,177,931 B1 | 1/2001 | Alexander et al. |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,660,416 B1 | 2/2010 | Kline |
| 7,761,892 B2 | 7/2010 | Ellis et al. |
| 7,774,819 B2 | 8/2010 | Perez |
| 7,778,980 B2 | 8/2010 | Bodin et al. |
| 7,801,847 B2 | 9/2010 | Kiilerich et al. |
| 7,822,644 B2 * | 10/2010 | Alberth et al. ............. 705/26.41 |
| 7,996,754 B2 | 8/2011 | Bodin et al. |
| 8,046,801 B2 | 10/2011 | Ellis et al. |

(Continued)

FOREIGN PATENT DOCUMENTS

| | | |
|---|---|---|
| EP | 1069491 A2 | 1/2001 |
| EP | 1081574 A1 | 3/2001 |

(Continued)

OTHER PUBLICATIONS

"International Application Serial No. PCT/US2010/051448, International Preliminary Report on Patentability mailed May 31, 2012", 7 pgs.

(Continued)

Primary Examiner — Kambiz Zand
Assistant Examiner — Aubrey Wysznski
(74) Attorney, Agent, or Firm — Ropes & Gray LLP

(57) ABSTRACT

Systems and methods are provided for assignment and exchange of temporary access rights based on proximity of user devices. A first user device may receive a temporary access right that enables a second user device to access a content asset which the first user device is not authorized to access. In response to receiving the temporary access right, the first user device may access the content asset. Access to the content asset may be maintained after the first user device leaves the proximity of the second user device until the content asset is played back in its entirety. The proximity may be based on physical location or virtual connections through online services. The temporary access right may be requested by or assigned to the first user device from the second user device and may limit the number of times that the content asset is accessed on the first user device.

22 Claims, 15 Drawing Sheets

(56) References Cited

U.S. PATENT DOCUMENTS

| | | |
|---|---|---|
| 8,346,867 B2 | 1/2013 | Sharkey |
| 8,484,299 B2 | 7/2013 | Mizosoe et al. |
| 8,631,508 B2 | 1/2014 | Woods |
| 2002/0099695 A1 | 7/2002 | Abajian et al. |
| 2002/0174428 A1 | 11/2002 | Agnihotri et al. |
| 2002/0174430 A1 | 11/2002 | Ellis et al. |
| 2003/0110499 A1 | 6/2003 | Knudson et al. |
| 2003/0141987 A1 | 7/2003 | Hayes |
| 2004/0034650 A1 | 2/2004 | Springer et al. |
| 2004/0073920 A1 | 4/2004 | Yuen et al. |
| 2004/0220926 A1 | 11/2004 | Lamkin et al. |
| 2005/0060266 A1 | 3/2005 | DeMello et al. |
| 2005/0091169 A1 | 4/2005 | Peinado et al. |
| 2005/0108320 A1 | 5/2005 | Lord et al. |
| 2005/0114896 A1 | 5/2005 | Hug et al. |
| 2005/0138576 A1* | 6/2005 | Baumert et al. ............. 715/862 |
| 2005/0210135 A1 | 9/2005 | Abrahams et al. |
| 2005/0251827 A1 | 11/2005 | Ellis et al. |
| 2006/0107330 A1 | 5/2006 | Ben-Yaacov et al. |
| 2006/0161538 A1 | 7/2006 | Kiilerich |
| 2006/0195513 A1 | 8/2006 | Rogers et al. |
| 2007/0073704 A1 | 3/2007 | Bowden et al. |
| 2007/0078993 A1 | 4/2007 | Issa |
| 2007/0083915 A1* | 4/2007 | Janakiraman et al. ............ 726/4 |
| 2007/0156726 A1 | 7/2007 | Levy |
| 2007/0192684 A1 | 8/2007 | Bodin et al. |
| 2007/0220024 A1 | 9/2007 | Putterman et al. |
| 2007/0226238 A1 | 9/2007 | Kiilerich et al. |
| 2007/0239611 A1 | 10/2007 | Blum |
| 2007/0276866 A1 | 11/2007 | Bodin et al. |
| 2008/0103977 A1 | 5/2008 | Khosravy et al. |
| 2008/0109366 A1 | 5/2008 | Read |
| 2008/0109368 A1 | 5/2008 | Read et al. |
| 2008/0113787 A1 | 5/2008 | Alderucci et al. |
| 2008/0134043 A1 | 6/2008 | Georgis et al. |
| 2008/0140433 A1 | 6/2008 | Levy et al. |
| 2008/0147650 A1 | 6/2008 | Marsh |
| 2008/0155453 A1 | 6/2008 | Othmer |
| 2008/0195871 A1 | 8/2008 | Peinado et al. |
| 2008/0276279 A1 | 11/2008 | Gossweiler et al. |
| 2009/0019364 A1 | 1/2009 | Cho et al. |
| 2009/0049074 A1 | 2/2009 | Dara-Abrams et al. |
| 2009/0187657 A1 | 7/2009 | Uemitsu |
| 2009/0201896 A1 | 8/2009 | Davis et al. |
| 2009/0271826 A1 | 10/2009 | Lee et al. |
| 2010/0067705 A1* | 3/2010 | Boccon-Gibod et al. ..... 380/285 |
| 2010/0071005 A1 | 3/2010 | Kusunoki |
| 2010/0121941 A1 | 5/2010 | Harrang et al. |
| 2010/0153885 A1 | 6/2010 | Yates |
| 2010/0185765 A1 | 7/2010 | Kang et al. |
| 2010/0251305 A1 | 9/2010 | Kimble et al. |
| 2010/0293058 A1 | 11/2010 | Maher et al. |
| 2010/0299522 A1 | 11/2010 | Khambete |
| 2011/0069940 A1 | 3/2011 | Shimy et al. |
| 2011/0083073 A1* | 4/2011 | Atkins et al. .................. 715/704 |
| 2011/0116376 A1 | 5/2011 | Pacella et al. |
| 2011/0125585 A1 | 5/2011 | Dow et al. |
| 2011/0125753 A1 | 5/2011 | Dow et al. |
| 2011/0125774 A1 | 5/2011 | Dow et al. |
| 2011/0125809 A1 | 5/2011 | Woods et al. |
| 2011/0126104 A1 | 5/2011 | Woods et al. |
| 2011/0126230 A1 | 5/2011 | Dow et al. |
| 2011/0264743 A1* | 10/2011 | Baumert et al. .............. 709/204 |
| 2012/0174148 A1* | 7/2012 | Hon et al. ...................... 725/25 |
| 2013/0145284 A1 | 6/2013 | Anantharaman et al. |
| 2013/0174223 A1 | 7/2013 | Dykeman et al. |
| 2013/0174273 A1 | 7/2013 | Grab et al. |

FOREIGN PATENT DOCUMENTS

| | | |
|---|---|---|
| EP | 1162810 | 12/2001 |
| JP | 2009175790 A | 8/2009 |
| WO | WO 00/23926 | 4/2000 |
| WO | WO 00/56066 | 9/2000 |
| WO | WO 00/58895 | 10/2000 |
| WO | WO 01/53994 | 7/2001 |
| WO | WO 01/67317 | 9/2001 |
| WO | WO 03/042866 | 5/2003 |
| WO | WO 2004/044821 | 5/2004 |
| WO | WO 2005/015429 | 2/2005 |
| WO | WO-2009107320 A1 | 9/2009 |
| WO | WO 2011/062688 | 5/2011 |
| WO | WO 2011/062689 | 5/2011 |
| WO | WO 2011/062690 | 5/2011 |
| WO | WO 2011/062691 | 5/2011 |
| WO | WO 2011/0163177 | 12/2011 |

OTHER PUBLICATIONS

"International Application Serial No. PCT/US2010/051448, Search Report mailed Feb. 11, 2011", 5 pgs.

"International Application Serial No. PCT/US2010/051448, Written Opinion mailed Feb. 11, 2011", 5 pgs.

"International Application Serial No. PCT/US2010/051493, Preliminary Report on Patentability mailed May 31, 2012", 16 pgs.

"International Application Serial No. PCT/US2010/051493, Search Report mailed Dec. 23, 2010", 5 pgs.

"International Application Serial No. PCT/US2010/051493, Written Opinion mailed Dec. 23, 2010", 5 pgs.

"International Application Serial No. PCT/US2010/051506, Search Report mailed Feb. 10, 2011", 5 pgs.

"International Application Serial No. PCT/US2010/051506, Written Opinion mailed Feb. 10, 2011", 5 pgs.

"International Application Serial No. PCT/US2010/051511, Search Report mailed Jan. 24, 2011", 5 pgs.

"International Application Serial No. PCT/US2010/051511, Written Opinion mailed Jan. 24, 2011", 5 pgs.

"Spyglass Prism", Spyglass Prism. Concepts and Applications, XP002907213,(Jan. 1, 1997), 8 pgs.

Ma, W. Y, et al., "Framework for adaptive content delivery in heterogeneous network environments", XP002168331, [Online]. Retrieved from the Internet: <URL: http://www.cooltown.hp.com/papers/adcon/MMCN2000>, (Jan. 24, 2000).

* cited by examiner

900

Device Screen from Server

| Welcome | Jim Jones | To: Mobile Theatres |
|---|---|---|

All ▼ — 920

| Rank | Title | Rating | Viewers |
|---|---|---|---|
| 1 | Immortals | 5 ☆ | 1/5 |
| 2 | Invincible | 5 ☆ | 2/2 |
| 3 | Smurfs | 5 ☆ | 0/3 |
| 4 | Cars 2 | 3 ☆ | 1/2 |
| 5 | Chicken Little | 3 ☆ | 2/5 |

| Title \ Time | ◄ 4:00 PM | 5:00 PM | 6:00 PM ► |
|---|---|---|---|
| Immortals | | 1/5 | 0/5 |
| Invincible | | 2/2 | 1/2 |
| Smurfs | | 0/3 | 0/3 |
| Cars 2 | | 1/2 | 0/2 |
| Chicken Little | | 2/5 | 3/5 |

FIG. 9

SYSTEMS AND METHODS FOR TEMPORARY ASSIGNMENT AND EXCHANGE OF DIGITAL ACCESS RIGHTS

BACKGROUND OF THE DISCLOSURE

Traditional digital rights management (DRM) systems allow assignment of access rights for content that enables a user to access the content on a user device.

SUMMARY OF THE DISCLOSURE

In view of the foregoing, methods and systems are provided for assigning or exchanging temporary access rights to content assets from a first user device to a second user device, both located within a physical or virtual proximity. As referred to herein, the term "temporary access right" should be understood to mean an access right that expires after a predetermined time (e.g., when play back of the content asset completes). As referred to herein, the term "predetermined time" may indicate a time duration during which a temporary access right is valid. The predetermined time may be set by a user, may be based on a length of a content asset corresponding to the temporary access right or may be based on the amount of time required to finish play back a content asset in its entirety. When the either of the first user device or second user device leaves the proximity, the temporary access right may expire. As referred to herein with regards to temporary access rights, the term "expire" should be understood to mean that access to a content asset is terminated or becomes restricted. In some implementations, the temporary access right may expire when the assigning user terminates the access right. In some implementations, the temporary access right may expire when the assigning user completes access of the content asset. In some implementations, the temporary access right may expire when the assignee user completes access of the content asset. In some implementations, the temporary access right may expire when the assignee user device plays back the content asset in its entirety.

A proximity may refer to a physical proximity or virtual proximity. A physical proximity may refer to a measurable range within which detecting circuitry of an electronic device is able to detect a minimum signal, or a perceivable range between a first and second user. A measurable range may include a wireless range within which a first wireless device is able to detect a wireless signal received from a second wireless device, a visual detection range within which a biometric device such as a camera is able to resolve two points, an audio detection range within which a microphone is able to detect audio, or any other suitable measurable range or any combination thereof. A perceivable range may be a distance or region within which a first user associated with a first user device and a second user associated with a second user device are able to perceive each other through sight, hearing, smell, or any other suitable sense for perception.

A virtual proximity may refer to an active session of an online service, to which a first and second user devices are connected. As referred to herein, the term "session" may refer to a temporary information interchange between two or more electronic devices connected via a communication path. The first user device and second user device may be logged into an online social network service or other multi-user online service, hosted on a web server or network of web servers. In such multi-user services, the first user device may log into a first account, the second user device may log into a second account, and the first and second accounts may be connected or coupled within the service.

In some embodiments, a first user device may detect a second user device within a proximity of the first user device. Responsive to detecting the second user device, the first user device may receive content authorization information that enables access to a content asset on the second user device which the first user device is not authorized to access. (e.g., prior to receiving the content authorization information including an access right to a content asset, the second user device may have been authorized to access the content asset and the first user device may not have been authorized to access the content asset). Using the received content authorization information, the first user device may enable access to the content asset. In response to determining that the first user device has left the proximity of the second user device, the first user device may maintain access to the content asset until play back of the content asset has been completed.

In some implementations, in response to determining that the first user device is no longer within a proximity of the second user device, control circuitry of the first user device may maintain access to the content asset for a duration of time. For example, after the duration of time, access to the content asset may be terminated or restricted on the first user device. The duration of time may be set based on user profile information of a user of a first user device, content authorization information, user input information, any other suitable information, or any combination thereof.

In some implementations, access of the content asset may include the operations of play back, fast forward, rewind, or pause. The number of times the content asset may be accessed may be limited by a temporary access right. A first user device receiving a temporary access right to a content asset may be limited by the temporary access right in the type and number of operations it may perform to access the content asset. For example, a first user device may only play back a content asset twice, and rewind the content asset once.

In some implementations, the content authorization information may include access rights, meta data, user profile information, operation limit information or a hash code. For example, content authorization information may include a number of access rights for different content assets, and user profile information of an associated user.

In some embodiments, a user device may receive content authorization information including a temporary access right in response to transmitting a request for a temporary access right. In some embodiments, a second user device may generate a temporary access right to transmit to a first user device in response to receiving a user request to assign a temporary access right to a first user device or a first user associated with the first user device.

In some embodiments, a first user device corresponding to a first user may detect a second user device corresponding to a second user, and identify the second user, when the second user device is within a physical proximity of the first user device. The first user device may establish a content sharing relationship with the second user device. The first user device may retrieve content authorization information associated with the first user and may update second content authorization information associated with the second user, based on the first content authorization information in order to temporarily enable the second user device to access content assets that are accessible by the first user device.

In some implementations, the first user device and second user device may temporarily exchange access rights to content assets. The first user device may update the second content authorization information to enable access to a first content asset corresponding to a first access right included in the first content authorization information. Likewise the second user device may update the first content authorization information to enable access to a second content asset corresponding to a second access right included in the second content authorization information.

In some implementations, content authorization information may include an access right to access content which requires authorization from the provider of the content received from a web server. A user device may periodically obtain access right information from a web server to enable access to a content asset on a user device.

In some implementations, content authorization information may include an access right to access content that does not require authorization to be retrieved from a web server. The access right may include a hash code based on a first hardware configuration of a first user device. If the access right is transferred to a second user device having a second hardware configuration different from the first hardware configuration, control circuitry of the second user device may not enable access to the content asset on the second user device if the control circuitry determines that the hash code of the access right does not match a hash code calculated based on the hardware configuration of the second user device.

In some embodiments, a system may include a first user device associated with a first user, a second user device associated with a second user, and a distribution point. When the distribution point detects the first and second user devices within a physical proximity, the distribution point may retrieve first and second content authorization information that are associated with the first and second users respectively. The distribution point may add access rights included in the retrieved content authorization information to a central database, and update the first and second content authorization information to include temporary access rights to content assets that each content authorization information did not previously include. For example, each distribution point may update first content authorization information to include a temporary access right corresponding to an access right from second content authorization information. The temporary access right may enable access to a content asset that the second content authorization information was able to access, but that the first content authorization information was not able to access.

In some implementations, the system may include multiple distribution points, such as a first distribution point and second distribution point that are connected by a communications network. A first user device may be within a physical proximity of the first distribution point, a second user device may be within a physical proximity of the second distribution point, but the first and second user devices may not be within a physical proximity of each other. The first and second distribution points may retrieve first and second content authorization information associated with the first and second user, and add the access rights associated with the retrieved content authorization information to a central database. Each of the first and second distribution points may temporarily update first and/or second content authorization information to include access rights to content assets that each did not previously include.

In some embodiments, a system may include a first user device associated with a first user and a second user device associated with a second user that are within a virtual proximity, via a social network or remote connection over a communication network. The first user device and second user device may exchange access rights to content assets through the social network. The content authorization information associated with each user may be updated to include the exchanged asset rights.

Further embodiments and implementations of the disclosure will be described in reference to the figures and text that follow below.

BRIEF DESCRIPTION OF THE DRAWINGS

FIG. 9 illustrates a screen 900 that may be displayed on a user device or distribution point that is part of a system including a distribution point in accordance with some embodiments of the present disclosure;

DETAILED DESCRIPTION OF EMBODIMENTS

Figure 1:
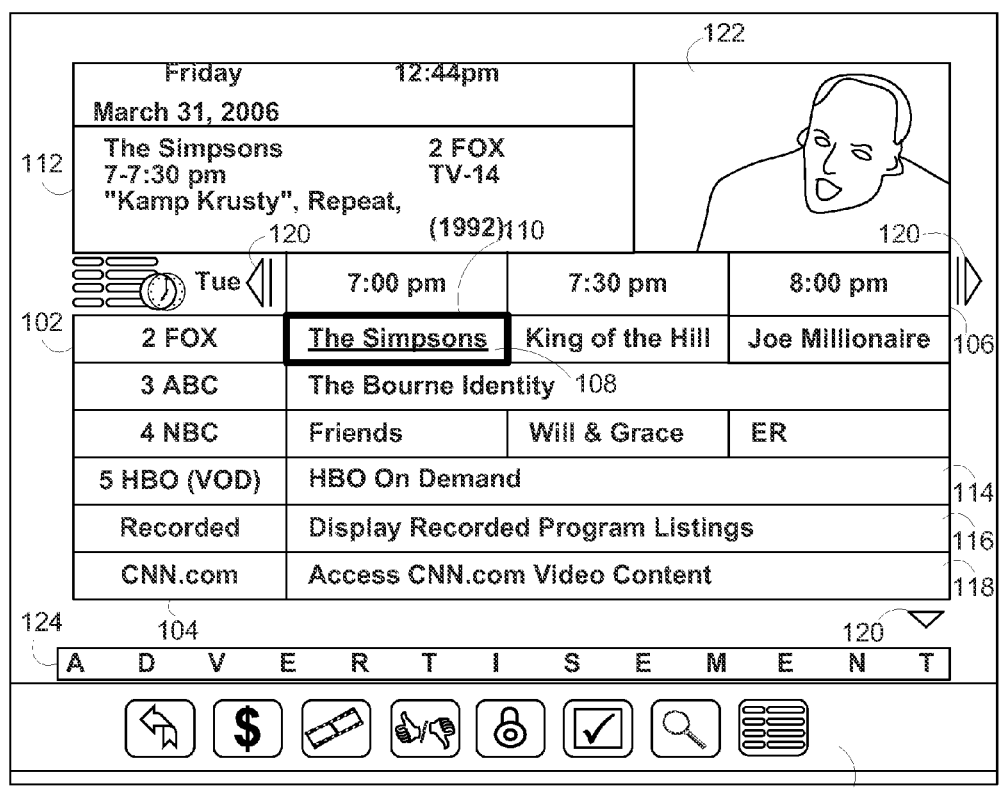
FIG. 1 shows an illustrative interactive media guidance application display screen in accordance with one embodiment of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Another one of the functions of the media guidance application may be to provide digital rights management. As defined herein, digital rights management refers to the control of access rights that enable access to content assets by users or user devices. In some embodiments, a DRM system may be implemented as part of a media guidance application. In some implementations, the DRM system may control access to content based on user profile information, device information, any other suitable information or any combination thereof. For example, an access right may be associated with user profile information, so that access to a content asset is enabled on a device if the associated user profile is detected on the device. For example, an access right may be associated with a specific hardware configuration of a device, so that access to a content asset is enabled on a device if the specific hardware configuration of the device is detected. DRM systems may enable proximity dependent access rights. For example, when a first user device detects a second user device within a proximity, it may receive content authorization information that enables it to access a content asset that the second user device is authorized to access. Further embodiments and implementations of DRM systems will be discussed in detail below.

Figure 2:
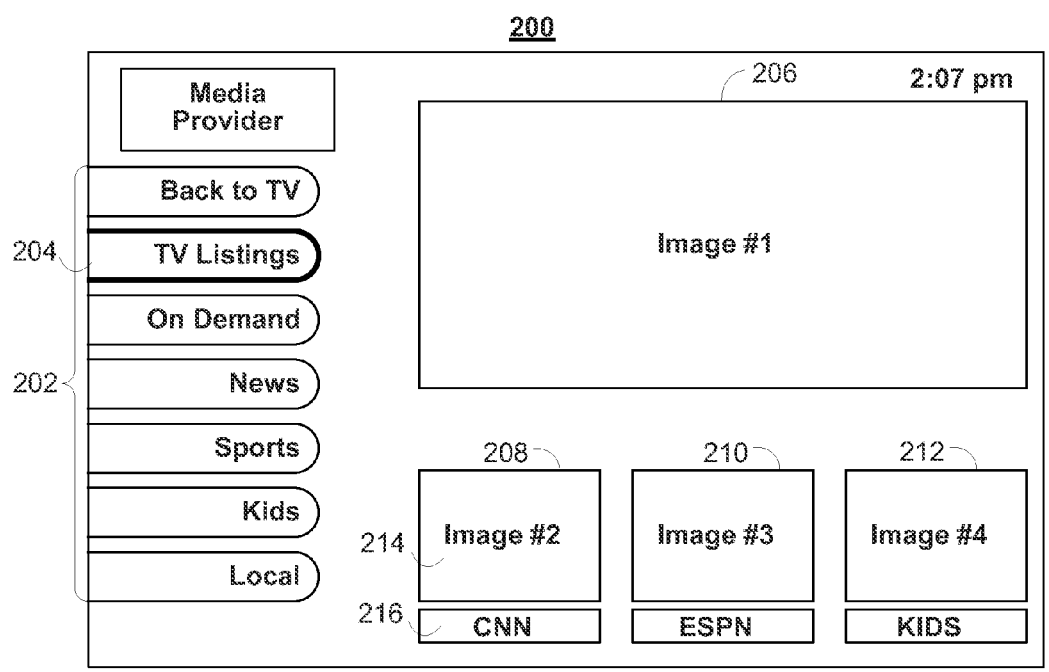
FIG. 2 shows another illustrative interactive media guidance application display screen in accordance with one embodiment of the present disclosure.

FIGS. 1-2 show illustrative display screens that may be used to provide media guidance data. The display screens shown in FIGS. 1-2 and 7-10 may be implemented on any suitable user equipment device or platform. While the displays of FIGS. 1-2 and 7-10 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or by pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. In DRM systems, a user may indicate desire to request or provide temporary access rights to content assets by selecting any of the aforementioned selectable options provided in the display screen. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

In some embodiments, an access right may be required to view a content asset shown in the grid of FIG. 2. For example, a subscription is often required to view an on-demand asset 114, recorded asset 115 or internet content asset 116. In some implementations, a user may purchase an access right to access a content asset. In some implementations, a first user may request a temporary access right from a second user who is authorized to access the content asset. In some embodiments, in response to selecting any of listings 114, 116 and 118, any of screens 700 of FIG. 7, 800 of FIG. 8, 900 of FIG. 9 or 1000 of FIG. 10 may be shown. Further embodiments and implementations for temporary access rights are described further below.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to share content authorization information with other users, options to request content authorization information to access a content asset, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

User profile information may be information that identifies or indicates characteristics of a particular user. User profile information may include name, gender, age, race, preference, mood, status, a unique identification code or any other suitable information indicating characteristics of a user. Preference information may indicate favorite content related information. For example, preference information may include a user's favorite genre, category, metadata terms, any other suitable information or any combination thereof. Preference information may also indicate a user's most commonly accessed content asset. For example, preference information may indicate that a user accesses a particular song more often than any other songs on a media equipment device or user device. The user profile information may be entered by a user, or learned from tracking access habits of a user. For example, a user may enter profile information into a user device. A user device may also track usage statistics and update profile information. For example, an mp3 player may tally the different genres of content accessed by a user. User profile information may be used to assist in ranking content assets or content that a user is authorized to access. Methods and systems for using user profile information have been described in detail in U.S. Pat. No. 6,177,931, issued Jan. 23, 2011, which is hereby incorporated by reference herein in its entirety.

In some embodiments, a DRM system may obtain user profile information from a media guidance application. For example, a DRM system may determine category or type of content that is most commonly accessed by a user. In some implementations, in which a first user is able request temporary access rights from another user, or able to assign temporary access rights to another user, the DRM may determine with whom the first user most commonly shares access rights. In some embodiments, in response to selection of a selectable option, a menu screen may be displayed that enables assignment of temporary access rights. For example, any of screens 700 of FIG. 7, 800 of FIG. 8, 9000 of FIG. 9, or 1000 of FIG. 10

In some embodiments, a user may be able to temporarily exchange or assign access rights to content assets using the media guidance application. For example, the user may select one of the selectable options of options regions 126 to access a menu screen to establish a content sharing relationship with another user or to temporarily assign an access right to another user. For example, the user may select one of the content asset listings 114, 116, 118 or any other suitable listing to temporarily assign to a second user of a second user device. In some implementations, a user may be able to request temporary access to a content asset from another user. For example, a user may be able to select any of asset listings 114, 116, 118, or any other suitable listing to request a temporary access right from another user who may have an access right. The duration of the temporary access right may correspond to the length of the content asset, which may be indicated by the time identifiers 106. Access to the content asset on the second device may be terminated or restricted after the duration indicated by the time identifiers 106.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

In some embodiments, a user may be able to share access rights by selecting any of listings 206, 208, 210 or 212. For example, the user may be able to access the any of menu screens of FIG. 7, FIG. 8 or FIG. 9 in response to selection of a listing. In some implementations, a user may be able to request a temporary access right by selecting a listing. In some implementations, a user may be able to temporarily assign an access right by selecting a listing.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
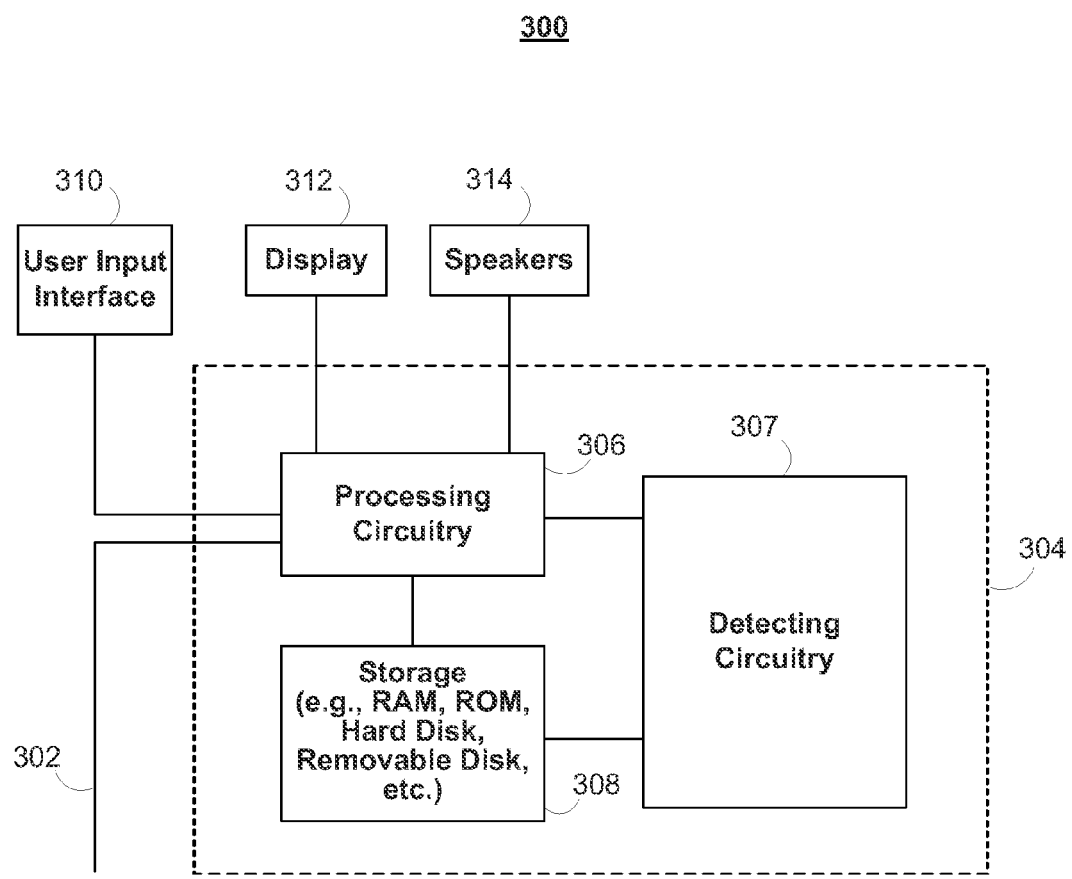
FIG. 3 illustrates an example of a user device that may be used in accordance with some embodiments of the present disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which may include processing circuitry 306, detecting circuitry 307, and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications network or path (which is described in more detail in connection with FIG. 4). In addition, communications circuitry may include circuitry that enables peer-to-peer communication of user equipment devices, or communication of user equipment devices in locations remote from each other (described in more detail below).

In some embodiments, control circuitry 304 may include detecting circuitry 307 which may be capable of detecting and/or identifying a user or users without requiring the user or users to make any affirmative actions by using any suitable biometric recognition technique, such as facial recognition, heat signature recognition, odor recognition, scent recognition, body shape recognition, voice recognition, behavioral recognition, or any other suitable biometric recognition technique. In some embodiments detecting circuitry may detect or identify a user device using wireless detection techniques, as will be described in further detail below. For example, detecting circuitry 307 may detect and identify users using these techniques while the users are within a measurable range to an electronic device. The measurable range may be limited by capability of the detecting circuitry to resolve or measure features. For example, the measurable range from which a camera may resolve two spaced points may be limited based on optical resolution of the camera. For example, the measurable range from which a wireless antenna may be able to detect a received signal above background noise may depend on the initial intensity of the transmitted signal and an absorption coefficient of the surrounding transmission medium. In some embodiments, users may be detected and/or identified using any other suitable biometric recognition technique that may in some embodiments require the users to be within a measurable range to an electronic device, for example, iris recognition, retinal recognition, palm recognition, finger print recognition, or any other suitable technique.

Detecting circuitry 307, by using wireless detection techniques, may also be capable of detecting and/or identifying a user or users based on recognition and/or identification of a user device (e.g., a mobile device, such as an RFID device or mobile phone). Detecting circuitry 307 may recognize and identify such a device using any suitable means, for example, radio-frequency identification, Bluetooth, Wi-Fi, WiMax, internet protocol, infrared signals, any other suitable Institute for Electrical and Electronics Engineers (IEEE), industrial, or proprietary communication standards, or any other suitable electronic, optical, or auditory communication means. In some embodiments, detecting circuitry may detect a user. For example, detecting circuitry 307 may determine that a user is within a detection region of an electronic device, identify the user, and add the user to a list of active users at the electronic device. The detection and identification of users as described herein does not require any affirmative action on the part of the user beyond, in some embodiments, the configuration of such methods and systems. For example, any detection and identification of users is done automatically by electronic devices. In some embodiments, detecting circuitry may detect a user device. For example, detecting circuitry 307 may determine by using wireless detection techniques that a user device is within a wireless detection region, and add the user device to a list of user devices at the electronic device.

Detecting circuitry 307 may include any suitable hardware and/or software to perform detection and identification operations. For example, detecting circuitry 307 may include infrared, optical, and/or radio-frequency receivers and/or transmitters. Detecting circuitry 307 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information. Detecting circuitry 307 may additionally, or alternatively, include palm, fingerprint, and/or retinal readers for detecting and/or identifying users. In some embodiments, detecting circuitry may communicate to processing circuitry 306 and/or storage 308 various detection and/or identification mechanisms indicating whether a user is detected and/or identified at a particular device.

For example, using an infrared camera and light source, processing circuitry 306 may generate a three dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time-of-flight, or time traveled by each light beam may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time-of-flight of beams, and the initial direction of the beam, processing circuitry 306 and/or detecting circuitry 307 may generate the three dimensional map of the area. Based on the three dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones it may be possible to generate a spatial areal map. Location of objects may be determined based on the spatial areal map generated via acoustic localization, IR time-of-flight, any other suitable mapping method, or any combination thereof. It should be understood that various biometric techniques and devices may be used alone, or in combination to supplement each other to more accurately identify or detect users.

In some embodiments, detecting circuitry 307 may use any suitable method to determine the distance, trajectory, and/or location a user is at in relation to an electronic device. For example, an electronic device may use received signal strength indication (RSSI) from a user's mobile device to determine the distance the user is to the electronic device. For example, RSSI values may be triangulated to determine a user's location. The electronic device may also use, for example, triangulation and/or time difference of arrival determination of appropriate information to determine a user's location in relation to an electronic device. For example, time difference of arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, processing circuitry 306 may determine a location based on global positioning system (GPS) measurements, or, in the case of cellular telephones, measurements based on cell-tower signals, done by detecting circuitry 307. Processing circuitry 306 may use these measurements to determine location coordinates which may be transmitted to other electronic devices.

As referred to below, an identified user may refer to a user who may be recognized sufficiently by a device to associate the user with a user profile. In some embodiments, the user may be associated with a group of users, as opposed to, or in addition to, being associated with a unique user profile. For example, the user may be associated with the user's family, friends, age group, sex, and/or any other suitable group. A detected user may refer to a user whose presence is detected by a device, but who is not yet identified by the device.

Memory may be an electronic storage device provided as storage 308 that is part of control circuitry 304. As referred to herein, the phrase "electronic storage device" or "storage device" should be understood to mean any device for storing electronic data, computer software, database or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, nonvolatile memory, quantum storage devices, gaming consoles, gaming media, or any other suitable fixed or removable storage devices, and/or any combination of the same. Storage 308 may be used to store various types of content described herein as well as media guidance information, described above, and guidance application data, described above including a list of active users at an electronic device, a list of past users at an electronic device, content authorization information, or other data used in operating the guidance application or DRM system. Storage 308 may store information related to the temporary assignment and exchange of access rights. For example, storage 308 may store a listing of temporary access rights. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or combination of user input interfaces. User input interface 310 may communicate with one or more media devices. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll more slowly and when more pressure is applied, the listings scroll more quickly. The pressure-sensitive buttons may control any portion of the guidance application or an electronic device in any suitable manner.

In some embodiments, user input interface 310 may be incorporated into a mobile device, such as a mobile phone. In such embodiments, user input interface 310 may obtain appropriate commands, information, and/or updates associated with a user or media device, or any other suitable information via the cellular phone network.

Figure 4:
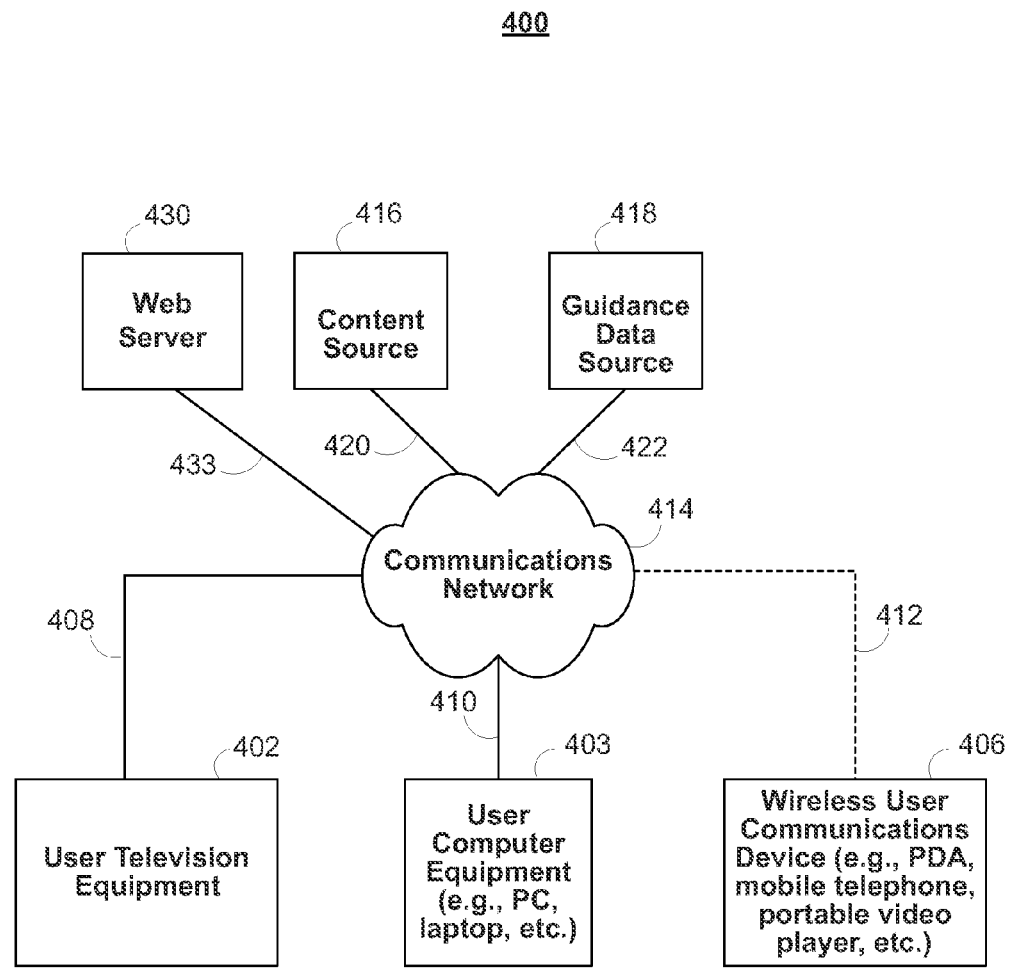
FIG. 4 illustrates an example of a system that may be used in accordance with some embodiments of the present disclosure.

In some embodiments, user input interface 310 may communicate with media devices using a communications path as described in reference to FIG. 4. For example, user input interface 310 that may be incorporated into a user's mobile phone may communicate with media devices using a wireless communications path. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output wireless packets to communicate with user's scroll instructions. An intermediate device may receive the wireless packets and, in turn, transmit infrared packets to control circuitry 304.

In some embodiments, user input interface 310 may store, transmit, and/or receive information associated with and/or identifying a particular user or users. This information may be used by detecting circuitry 307 to detect and/or identify that the user associated with the information is within a detection region of an electronic device. The user may then be added to a list of active users at the electronic device and/or logged into the electronic device.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

In some embodiments, control circuitry 304 may retrieve one or more user selected programs that are provided by a content source. Control circuitry 304 may instruct a storage device to store the content provided by the content source during the scheduled broadcast time (e.g., having a scheduled start time and a scheduled end time) of the program selected for recording.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first user device. In some embodiments, the second screen device provides an interface for adjusting settings and display preferences of the first user device. In some embodiments, the second screen device is configured for interacting with other second screen devices or for interacting with a social network. The second screen device can be located in the same room as the first user device, a different room from the first user device but in the same house or building, or in a different building from the first user device.

The user may also set various settings to maintain consistent media guidance application settings across in-home devices and remote devices. Settings include those described herein, as well as channel and program favorites, programming preferences that the guidance application utilizes to make programming recommendations, display preferences, multiple-user use and access configuration options, and other desirable guidance settings. For example, if a user sets a channel as a favorite on, for example, the web site www.all-rovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user or system operator, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTE is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

System 400 may include a web server 430 that may host a website, social network, an internet database of information, or any other suitable online service. User equipment 402 may receive through communications network 414 information (e.g., in real-time or during predefined time intervals) from one or more online services hosted by web server 430. Examples of social networks include Facebook™, MySpace™, and Google+™. Facebook is a trademark owned by Facebook Incorporated. MySpace is a trademark owned by Specific Media LLC. Google+ is a trademark owned by Google Incorporated. For example, content authorization information may be retrieved from an online service. The content authorization information may be used by control circuitry 204 to determine access rights and permissions for a user. In some implementations, control circuitry 304 may query an online service associated with a given event by issuing a communication to web server 430. In particular, control circuitry 304 may query the online service for content authorization information associated with a given identified user. Control circuitry 304 may use the information received from the online service to determine whether a user is authorized to access a content asset.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 of the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays may be generated by the media guidance data source 418 and transmitted transmit the generated displays to the user equipment devices. The server application may instruct the control circuitry of the media guidance data source 418 to transmit data for storage on the user equipment. The client application may instruct control circuitry of the receiving user equipment to generate the guidance application displays based on instructions processed by the control circuitry.

In some embodiments, a DRM system may be implemented separate from a media guide application. For example, a DRM system may be implemented as a stand-alone program, application, widget, applet, or any other suitable software, on a user device. In some implementations, a DRM system implemented as software may include a client version that runs on a user device and a host version that run on a web server. In some implementations, a DRM system may be implemented as software running on two user devices connected in a peer-to-peer network. Further examples of embodiments and implementations will be discussed in further detail below.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and BULU, which provide audio and video via IP packets. Youtube is a trademark owned by Google Inc., Netflix is a trademark owned by Netflix Inc., and Hulu is a trademark owned by Bulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or a portable music player.

In some embodiments, a number of user devices may share access rights to content assets in a home network. For example, a family of users may each be associated with a user device. In response to receiving an input from a first user, a first user device may assign a temporary access right to a second user device or second user. In a small home network, content authorization information including the temporary access right may be transmitted from the first user device to the second user device through the home network. Further embodiments are described in further detail in reference to FIG. 5.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In some embodiments, content authorization information that includes access rights to content assets may be stored on a web server. In some implementations, a user device may retrieve content authorization information from the web server via an internet connection, or any other suitable communications path.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In some embodiments, content authorization information may be stored on a content source, or web server. The content authorization information may be retrieved by a user device or a distribution point. Further embodiments are described below in reference to FIGS. 5B and 5C.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416, one or more media guidance data sources 418, and one or more of web servers 430. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

In some embodiments, a first user device and a second user device may be logged into the same session on an online service, and be within a virtual proximity. By using the online service, in response to receiving a first user input, the first user device may assign a temporary access right to a second user associated with a second user device. In some implementations, the temporary access right may be valid for the duration of the online session. Access to the content asset may be terminated or restricted on the second user device after the online session ends. For example, in response to determining that the online session has ended, control circuitry of a second user device may terminate access to the content asset. In some implementations, the access right may expire a predetermined time after the online session terminates. For example, in response to determining that the online session has ended, control circuitry of a second user device may maintain access to the content asset until the content asset has been played back in its entirety. In some implementations, in response to determining that the online session has terminated, control circuitry of a second user device that received a temporary access right may maintain access to the content asset until the content asset has been viewed in its entirety. In some implementations, content authorization information may be stored on the cloud. In some implementations, user profile information may be stored on the cloud.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content. Examples of cloud based services may include a social network, media sharing services, or any other suitable cloud based services. In some embodiments, a user may access a cloud based social network service through screen 1000 of FIG. 10. In some embodiments a user may access a cloud based content asset sharing service through any of screens 700 of FIG. 7, 800 of FIG. 8 or 900 of FIG. 9 as described in further detail below.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content. In some embodiments, a user may be able to control access to recorded content by generation of access rights for recorded content. For example, a first user may assign a temporary access right to a second user device to access a recorded content asset. In response to detecting a second user device, first control circuitry of a first user device may retrieve second hardware configuration information of the second user device and encrypt a recorded content asset as a function of the retrieved second hardware configuration information. In some implementations, the first control circuitry may retrieve second user profile information of a second user associated with the user device and encrypt the recorded content asset as a function of the second user profile information. The first control circuitry may upload the recorded content asset to a web server. The first control circuitry may generate a temporary access right that includes a decryption key to enables access to the recorded content asset by the second user device, when used by a second user associated with the second user profile information. Second control circuitry of the second user device may detect the first user device and in response, receive the temporary access right from the first user device and retrieve the recorded content asset from the web server. Second control circuitry may extract the decryption key from the temporary access right as a function of second user profile information and the second hardware configuration information. Second control circuitry may then access the recorded content asset. When second control circuitry completes playback of the recorded content asset, second control circuitry may terminate access to the recorded content asset, for example by deleting the temporary access right.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

A DRM system may enable a user to temporarily assign or exchange a digital access right with another user within a physical or virtual proximity. For example, a first user and second user may be located within the same waiting room. The first user may, using a first user device, temporarily assign an access right to a content asset, such as a movie, to a second user device of the second user. The second user may be authorized to temporarily access the content using the second user device. A DRM system may be implemented using any of the user devices described above in reference to FIG. 3 and FIG. 4. In some embodiments, a DRM system may include a media guidance application, or be implemented as part of a media guidance application. For example, a user interface to the DRM system may be accessed from display 100 of FIG. 1. The DRM system may be software that is stored on storage 308 and executed by processing circuitry 306. When executed by processing circuitry 306, the DRM system may instruct the processing circuitry to, for example, generate the various screens described below, direct display 312 to show the generated displays, transmit information on I/O path 302 or receive information from I/O path 302.

A user device may be a PDA, smart phone, laptop computer, tablet computer, or any suitable user device 300, as described in reference to FIG. 3 and FIG. 4, that identifies a user or enables access to content assets. A user device is often a mobile or portable device, carried by a user, and may contain identification information for a user, and/or content authorization information for the user. A user device may be owned by a user or loaned to a user.

A distribution point may be any electronic device 300, or suitable combination thereof that may coordinate the assignment and exchange of access rights between a group of user devices, each belonging to a user. Examples of an electronic device 300 have been described above in reference to FIG. 3 and FIG. 4. The distribution point may communicate with the user devices through any suitable communication path as previously described in reference to FIG. 3 and FIG. 4.

The term content authorization information may include any combination of identification information, a digital access right to a content asset, and/or permission information. The term content authorization information and license file may be used interchangeably. Identification information, such as user profile information, may identify a user in possession of the access rights. The digital access right may include metadata, an encryption key, hash code, date information, time information, identification numbers, digital water mark, term of validity of the access right, any other suitable information or any combination thereof. Permissions may include parental controls or distributor restrictions.

In some embodiments, content authorization information may include an access right to access content which requires authorization from the provider of the content. In some implementations, a content asset requiring authorization from a content provider may restrict access to the content asset by, for example, encrypting the content asset. For example, in order to access an encrypted content asset, processing circuitry 306 of a media equipment device may transmit an access right to a web server 430. At the web server, processing circuitry 306 may receive the transmitted access right and compare with a database of users and access rights stored in storage 308. In response to determining that the user corresponding to the transmitted access right is authorized to access the broadcast content asset, processing circuitry 306 of the web server 430 may transmit an encryption key to the media equipment device to enable the media equipment device to decrypt the encrypted content asset.

A content sharing relationship may refer to an association established between users or personal devices that enable a first user to temporarily assign and/or exchange access rights to content that the first user is authorized to access, to a second user. In some embodiments, the content sharing relationship may be established through a social network. For example, a first user and second user may establish a relationship on a social network, enabling shared access to account information of each user. In some embodiments, the content sharing relationship may be established ad hoc.

For example, a first and second user, having an associated first and second user device respectively, may establish a temporary connection via a communication path between the user devices when located within a proximity of each other. The first and second users may then establish a content sharing relationship through the connection between the two devices. In some implementations, the content sharing relationship may require mutual authentication and identification of each user. For example, a first and second user within a proximity may establish a temporary connection between a first and second user device. In order to establish the content sharing relationship, the first user may be prompted by the first user device to enter a one-time passcode displayed on the second user device, and the second user may be prompted by the second user device to enter a one-time passcode displayed on the first user device. This requires communication and mutual recognition of the users prior to establishing the content sharing relationship. In some implementations, in order to establish the temporary connection along the communication path between the first and second user device, mutual authentication of the users may be required, as described above with the exchange of the one-time passcodes. In some implementations, the temporary connection and/or content sharing relationship may be established without mutual authentication or identification of the users.

In some implementations, the temporary connection and/or content sharing relationship may be established by exchanging and comparing user profile information stored on each user device. For example, a first user may store a first list of trusted users, including a second user, in a first user device, and the second user may store a second list of users, including the first user, in a second user device. When establishing the temporary connection between devices and/or content sharing relationship, first and second user profile information may be exchanged between the first and second user devices, and compared against the trusted list of users. If each device determines that the exchanged user profile information matches a user of the trusted list of users, the temporary connection or content sharing relationship may be established.

The content sharing relationship may terminate when either first or second users are no longer within a proximity. For example, either of the first or second users may log out of a social network. First control circuitry of a first user device, second control circuitry of a second personal, third control circuitry of a distribution point, and/or fourth control circuitry of a web server hosting the social network may determine that the content sharing relationship has ended when any of the first or second user devices are no longer detected within a virtual proximity. For example, either of the first or second user devices may leave a proximity of the other user device, or a distribution point. In response to determining that the first user device or second user device is no longer within a proximity, first control circuitry of a first user device, second control circuitry of a second personal, third control circuitry of a distribution point, and/or fourth control circuitry of a remote web server 430 may determine that content sharing relationship has ended when any of the first or second user devices are no longer detected within a physical proximity of one another, or the distribution point.

In some embodiments, after termination of a content sharing relationship, a second user device may continue to access a content asset corresponding to a temporary access right. For example, a second user of a second user device may be assigned a temporary access right from a first user of a first user device. Control circuitry 304 of the first user device may generate the temporary access right based on first content authorization information associated with the first user and update second content authorization associated with the second user. Control circuitry 304 of the first user device may extract an access right listing from the content authorization information, and then generate a temporary access right listing that is similar to the extracted listing, and includes an expiration timestamp. Either the first user device or second user device may be carried outside the proximity thereby terminating the content sharing relationship. For example, in an airport waiting room, the first user may carry the first user device away from the waiting room, board a plane and shut off the user device, thereby leaving the proximity. After the content sharing relationship is terminated, control circuitry 304 of the second user device may continue to access the content asset associated with the temporary access right for a period of time that corresponds to the duration of the content asset. Access to the content asset may be terminated or restricted on the second user device after the duration of the content asset. For example, if the content asset is a movie, control circuitry 304 of the second user device may continue to play back the movie until the movie ends. In some implementations, control circuitry 304 may determine that play back has completed by checking for an end-of-file marker. In some implementations, control circuitry may maintain a play back timer that measures how much time has elapsed for play back of the content asset. The timer may be active during play back, and idle when paused. Control circuitry 304 may determine that play back of the content asset has completed when the measured time of the play back timer is equal to length of the content asset.

Figure 5A:
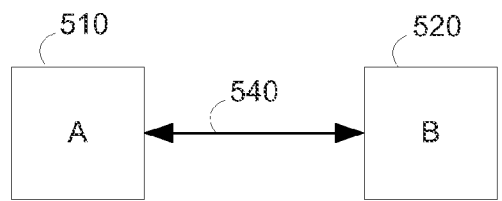
FIG. 5A-5C illustrates examples of user devices communicating with and without a distribution point in accordance with some embodiments of the present disclosure.
Figure 5B:
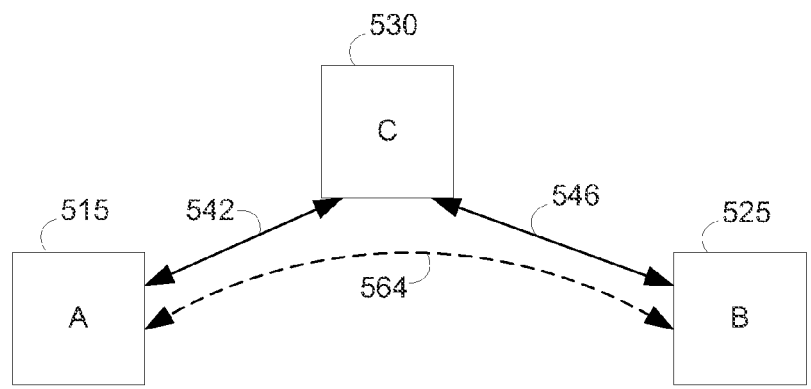
Figure 5C:
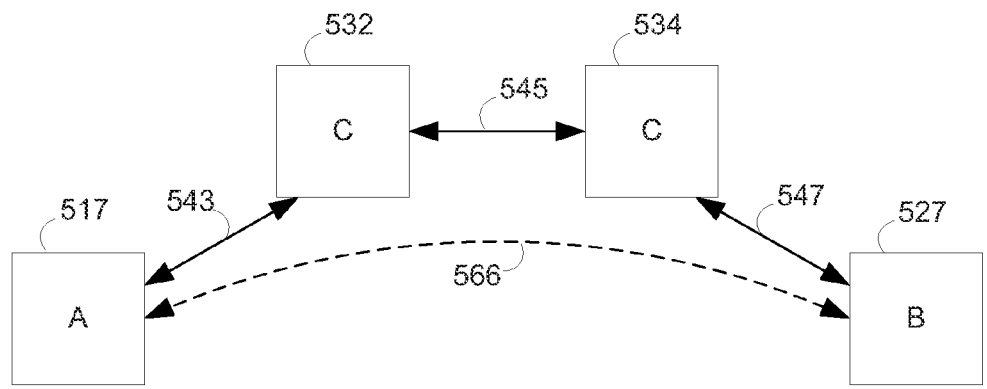

FIG. 5A-5C illustrates examples of user devices communicating with and without a distribution point in accordance with some embodiments of the present disclosure. User devices 510, 515, 517, 520, 525, and 527 may be any variant of an electronic device 300 described in reference to FIG. 3. Distribution point 530, 532 and 534 may be any variant of an electronic device 300 described in reference to FIG. 3. Communications path 540, 542, 543, 545, 546 or 547 may be any suitable communications path as described in reference to FIG. 4. Net paths 564 and 566 may be composed of any of communications paths 540, 542, 543, 545, 546, 547, any other suitable communications path, or any combination thereof.

As illustrated in FIG. 5A, in some embodiments, a first user device 510, labeled A, and a second user device 520, labeled B, may communicate through communications path 540. For example, a first user device 510 associated with a first user and a second user device 520 associated with a second user may be located within a physical proximity of each other. The first and second users may each have associated first content authorization information and second content authorization information, respectively, that includes access rights to content and content assets that each of the first and second users is authorized to access. The first user may temporarily assign an access right from the first content authorization information to a second user to enable the second user to access a content asset or content associated with the assigned access right. For example, user device 510 may form a peer-to-peer network across communication path 540 with user device 520. After forming the network, control circuitry of device 510 may, in response to a user input from interface 310, transmit a temporary access right to device 520.

As illustrated in FIG. 5B, in some embodiments, a first user device 515, labeled A, and a second user device 525, labeled B, may communicate through a distribution point 530, labeled C. The first and second user devices 515 and 525 may establish a temporary connection to distribution point 530 through communications paths 542 and 546, respectively, thereby establishing a net path 564 from the first user device 515 to the second user device 525. For example, a first user device 515, such as a first tablet computer, and a second user device 525, such as a second tablet computer, may each connect to a distribution point 530, such as a wireless router. Upon connecting to the distribution point, the first user device 515 and second user device 525 may communicate through the distribution point 530 to enable a first user and second user to temporarily assign and/or exchange access rights to content assets.

As illustrated in FIG. 5C, in some embodiments, a first user device 517, labeled A, and a second user device 527, labeled B, may communicate by connecting to a networked set of distribution points 532 and 534, labeled as C1 and C2. The distribution points 532 and 534 may be connected by a communication path 545. First user device 517 may connect to distribution point 532 by communication path 543, and second user device 527 may connect to distribution point 534 by communication path 547. Accordingly, the first user device 517 and second user device 527 may communicate across net path 566 to transmit and receive temporary access right information. In these embodiments in order to establish a content sharing relationship, user device 517 and user device 527 may not need to be located within a proximity of each other, but at least located within a proximity of a distribution point 532 or 534.

Figure 6:
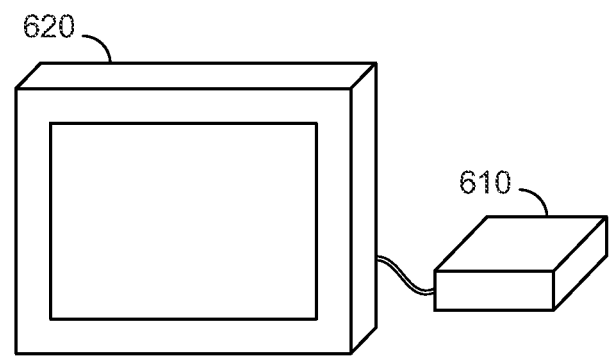
FIG. 6 illustrates examples of user devices and distribution points that may be used in accordance with some embodiments of the present disclosure.
Figure 6:

FIG. 6 illustrates examples of user devices and distribution points that may be used in accordance with some embodiments of the present disclosure. A distribution point may include set-top box 610, television equipment 620, any other media device 300 or any combination thereof as described in FIG. 3 and FIG. 4. In some implementations, the distribution point may not include a display device 212. Personal devices may include tablet computer 640 and 650, or any other suitable user device 300, as described in FIG. 3 and FIG. 4.

Tablet computer 640 and tablet computer 650 may each correspond to a first and second user respectively. In some embodiments, user profile information and/or content authorization information corresponding to a user may be stored on a tablet computer, or any other suitable user device 300. For example, tablet computer 640 may store first content authorization information corresponding to a first user, and tablet computer 650 may store second content authorization information corresponding to a second user. The user profile information may enable identification of the user, and the content authorization information may describe the access rights or permissions associated with the user. The content authorization information of a user may correspond to a content asset stored: on a user device 300 corresponding to the user, on a different user device corresponding to a different user, on a webserver 430, on any other suitable media device 300 or any combination thereof. In some embodiments, content authorization information of a user may not be stored on a user device corresponding to the user, but accessed based on user profile information stored on the user device from a webserver 430, content source 416, guidance data source 418, any other suitable electronic device, or any combination thereof. For example, tablet computer 640 and tablet computer 650 may store user profile information, but not content authorization information, associated with a first and second user respectively. Each tablet computer may retrieve content authorization information associated with the corresponding user from a remote server.

A distribution point may include television equipment 620, set top box 610, any other suitable electronic device 300, or any combination thereof. The distribution point may communicate with user devices to coordinate the temporary assignment and exchange of access rights. For example, a distribution point may include television equipment 620 and set top box 610 as shown in FIG. 6. A first user may use tablet computer 640 to connect to the distribution point, and a second user may use tablet computer 650 to connect to the distribution point. In some embodiments, the distribution point may collect and aggregate content authorization from multiple users and display the access rights on television equipment 620. For example, control circuitry 304 of set top box 620 may retrieve first content authorization information associated with the first user and first content authorization information of the second user. The control circuitry 304 may extract the access rights from the retrieved content authorization information, determine content assets associated with the access rights and display information about the associated content assets. For example, control circuitry of the set-top box 610 may communicate with television equipment 620 to show the list of associated content assets on a display of the television equipment. Further details about the display of information about content assets associated with content access rights and content authorization information will be discussed further in reference to FIG. 9 below.

In some embodiments, the use of a distribution point may reduce the processing load from a user device. For example, as the number of user devices in a content sharing relationship increases, the number of connections that are maintained between pairs of user devices may also increase. For example, in a system of two devices, only one connection is established between the two devices. As the number of devices, N, increases, the number of connection pairs needed may increase as a function of N*(N−1)/2. By using a distribution point, communication between the devices may all be routed through the distribution point, instead of across pairwise connections on communications paths.

In some embodiments, the distribution point may not reduce the processing load from a user device if efficient peer-to-peer or ad hoc networks or protocols are used between the user devices.

In some embodiments, the establishment of a content sharing relationship may depend on whether a first user or first user device, a second user or second user device, and/or a distribution point are located within a proximity of each other. The proximity may be a physical proximity or virtual proximity. Physical proximity may be based on a physical or geographic location. For example, the first user and second user may be located in the same room within a distance of each other. Virtual proximity may be based on a virtual connection across remote locations. For example, the first user and second user may be logged into a session on a social network. Further details and embodiments involving virtual proximity are discussed further below in reference to FIG. 10. Methods and systems for detecting users within a physical proximity of an electronic device have been described in detail in U.S. patent application Ser. No. 12/565,486, filed Sep. 23, 2009, which is hereby incorporated by reference herein in its entirety.

The physical proximity may be determined based on methods of detecting or identifying user devices. In some embodiments, a user may be associated with a personal device such as tablet computer 540 or 550. Such personal devices are often carried on the body of the user. By identifying and determining the location of the device, a system may determine the location of the user.

In some embodiments, the physical proximity may be a physical distance between a user devices, a distribution point, any other suitable electronic device or any combination thereof. As described above in reference to FIG. 3 and FIG. 4, detecting circuitry 307 of a first electronic device may determine the first location coordinates of the first electronic device by using measurements of GPS signals, cell-tower signals or RSSI signals. The electronic device may transmit first location coordinates to a second electronic device or receive second location coordinates from a second electronic device that describe the location of the second electronic device. Based on the first and second coordinates, either the first electronic device or second electronic device may determine whether the first and second electronic devices are within a physical proximity. For example, control circuitry 304 may calculate a Euclidean distance between the location coordinates and determine whether the first and second user devices are within a physical proximity such as a threshold distance.

In some embodiments, the physical proximity between the two devices may be determined without determination of a location coordinate. For example, control circuitry 304 of a first electronic device may not determine a location coordinate, but may instead compare the RSSI of a second electronic device to a threshold to determine whether the first and second electronic devices are within a proximity.

In some embodiments, a physical proximity may refer to a region around an electronic device. The geometry or shape of the physical proximity may be spherical, based on a radius from the electronic device, or may be variable in shape. Certain use conditions may require control over the shape of the physical proximity region. For example, when a distribution point is used in a public area, it may be desirable to limit the range of the physical proximity of users and corresponding user devices that may connect to the distribution point. As an example, in an airline lounge, an operator may want to limit the temporary assignment and exchange of access rights to the physical boundaries of the lounge. As an example, the reliability of wireless connections is known to degrade with signal strength and distance between the devices. To improve user satisfaction of a DRM system that enables temporary exchange of access rights, the physical proximity may be limited to regions where the RSSI is greater than a minimum threshold.

In some implementations, wireless detection techniques may be used by control circuitry 304 of a first electronic device, such as a first user device or first distribution point, to determine spatial location information about a second electronic device, such as a second user device or second distribution point. By detecting the spatial location of a user device, the location of a user corresponding to the user device may be determined. For example, the 802.11N wireless protocol by the IEEE includes provisions for detecting location of an electronic device through the use of multiple antennas, and then forming a wireless beam to the electronic device in order to improve communications.

In some implementations, the shape and extent of the physical proximity may be dynamic and may vary with time. For example, depending on the crowding of an airport lounge, the range of the physical proximity may be increased to enable users to use the access right sharing services of the DRM system across a larger area for comfort. Control circuitry 304 of an electronic device that communicates across a wireless communications path may increase the range of the physical proximity by increasing the intensity of a transmission signal from the electronic device, or by decreasing a minimum threshold for RSSI.

A DRM system may be implemented using any of the electronic devices described in reference to FIG. 3 and FIG. 4, or any combination thereof. For example, as described above, a distribution point may include television equipment 620 and set-top box 610. A user device may be any of the electronic devices as described in reference to FIG. 3 and FIG. 4. The DRM may be implemented using software, such as a media guidance application, operating on an electronic device.

The DRM system may be configured according to any of the embodiments described in reference to FIG. 5A-C. In a peer-to-peer embodiment as illustrated in FIG. 5A, the DRM system may include one or more user devices. In a single distribution point embodiment, the DRM system may include one distribution point and one or more user devices. In a multiple distribution point embodiment, the DRM system may include a plurality of distribution points connected by any suitable communications path, and one or more user devices. In all of the aforementioned embodiments, the electronic devices may be connected by any suitable communications path as described in reference to FIG. 4.

In some embodiments a DRM system may be implemented including a remote web server 430, a first user device, a second user device, and/or a distribution point. A first component of software implementing the DRM system may be executed by processing circuitry of the remote server, a second component of software implementing the DRM system may be executed by processing circuitry of the distribution point and a third component of software implementing the DRM system may be executed by processing circuitry of the first user device and the second user device. In some implementations, first control circuitry of the first user device may periodically determine first location coordinates of the first user device and transmit the first coordinates to remote web server 430, and second control circuitry of the second user device may periodically determine second location coordinates of the second user device and transmit the second coordinates to remote web server 430.

In some implementations, control circuitry of the distribution point may periodically determine third location coordinates of the central distribution device and transmit information to the remote web server 430. In some implementations, control circuitry of the distribution point may detect and identify user devices within the proximity and transmit information about the identified users to remote web server 430. In some implementations, control circuitry of a user device may detect and identify other user devices within a proximity and transmit information about the detected users to a remote web server 430. The user device may be the first user device or the second user device. In some implementations, control circuitry 304 of remote web server 430 may receive the first, second and third location coordinates from the first user device, second user device and distribution point, respectively, and determine whether any of the first user device, second user device or distribution point are within a proximity of each other. In some implementations, control circuitry 304 remote web server may receive the identities of users detected within a proximity of any of the first user device, second user device or distribution point.

In response to determining that a first user device and a second user device are within a proximity of each other or a distribution point, control circuitry 304 of the web server 430 may retrieve first content authorization information associated with the first user of the first user device, second content authorization information of the second user device. Control circuitry 304 of the web server may then enable the first user device and second user device to establish a content sharing relationship, for example, through display of any of the screens of FIG. 7, FIG. 8, FIG. 9 or FIG. 10, as will be described further below. In response to receiving a request to temporarily assign an access right from a first user to a second user, control circuitry 304 of the web server may generate a temporary access right and update first content authorization information and/or second content authorization information, as described further above and below. Control circuitry 304 of the web server may also determine whether a temporary access right assigned from a first to a second user has expired, and in response to determining that the access right has expired, update first and second content authorization information, and disable access of the access right for the second user.

In some embodiments, a first user and second user may view a content asset on a shared media equipment device. In order to view the content asset, the first user and second user may each obtain a first access right and second access right, respectively. If the first user leaves a proximity of the shared media equipment device before the content asset has been played back in its entirety, the first user may continue to play back and view the content asset on a first user device, different from the shared media equipment device. For example, control circuitry 304 of the shared media equipment device may detect and identify the first user and second user, and then retrieve first and second content authorization information associated with the first and second users respectively from a web server, first user device, second user device or any other suitable electronic device. Control circuitry 304 of the shared media equipment device may generate a first and second temporary access rights for the first and second users respectively, to enable access to a content asset on the shared media equipment device.

Control circuitry 304 may maintain a first playback timer and a second playback timer for the first and second temporary access right. The control circuitry may increment the first and second timers during play back of the content asset. In some implementations, in response to detecting that a first user is no longer within a proximity of the shared media equipment device, control circuitry 304 of the shared media equipment device may stop the first timer, update the first temporary access right to include a duration indicating remaining time of the unplayed portion of the content asset, and update first content authorization information to include the temporary access right. The first content authorization information may be uploaded to a web server. In response to user input from the first user, a first user device may retrieve the updated first content authorization information that includes the first temporary access right. The first user device may then resume play back of the content asset on the first user device. Access to the content asset may be terminated or restricted on the first user device after the duration indicating remaining time of the unplayed portion of the content asset.

In some implementations, the shared media equipment device may receive an input from a first user requesting to pause viewing of the content asset. In response, control circuitry 304 of the shared media equipment device may pause the first timer and update the first temporary access right. In some implementations, the shared media equipment device may transmit the temporary access right to a first user device. For example, in response to receiving a user input requesting download of the temporary access right, control circuitry of the first user device may transmit a retrieval request to the shared media equipment device to retrieve the temporary access right. In response, control circuitry of the shared media equipment device may transmit the temporary access right to the first user device. The first user device may enable access to the content asset and play back the content asset on the first user device.

In some implementations, a first and second user devices may temporarily assign an access right to a shared media equipment device for shared viewing of a content asset. For example, a first user may be viewing a content asset on a first user device, and a second user may be viewing the content asset on a second user device. The first and second users may pause play back of the content asset on the first and second user devices. In response to input from the first user, first control circuitry of the first user device may pause play back of the content asset, and generate a first temporary access right that includes duration information about the remaining time of the unplayed content asset. The first control circuitry may then transmit the first temporary access right to the shared media equipment device. In response to input from the second user, second control circuitry of the second user device may generate a second temporary access right that includes duration information about the remaining time of the unplayed content asset. Second control circuitry of the second user device may then transmit the second temporary access right to the shared media equipment device. In some implementations, access to the content asset may be terminated or restricted on the shared media equipment device after either the shorter or longer of the durations of the first temporary access right and second temporary access right.

In response to receiving the first and second temporary access rights, the control circuitry of the shared media equipment device may enable access to the content asset and play back the content asset on the share media equipment device. In some implementations, control circuitry of the shared media equipment device may start playback from the earliest, or latest remaining unplayed portion of the content asset. In some implementations, control circuitry of the shared media equipment device may maintain a first timer and second timer for the first and second temporary access rights. Control circuitry may increment the timer during play back of the content asset. In response to detecting that a first user has left the proximity, control circuitry may update the first temporary access right to include a timestamp that indicates a duration of the remaining unplayed content asset. Control circuitry may then update first content authorization stored on a web server to include the updated access right. Control circuitry of a first user device may retrieve the first content authorization information and first temporary access right and enable access to the content asset and play back the content asset for a duration of time indicated by the timestamp. Access to the content asset may be terminated or restricted on the first user device after the duration indicated by the timestamp. Access of media content on a shared media equipment device is described in greater detail in U.S. patent application Ser. No. 13/341,506, filed Dec. 30, 2011, which is hereby incorporated by reference herein in its entirety.

Figure 7:
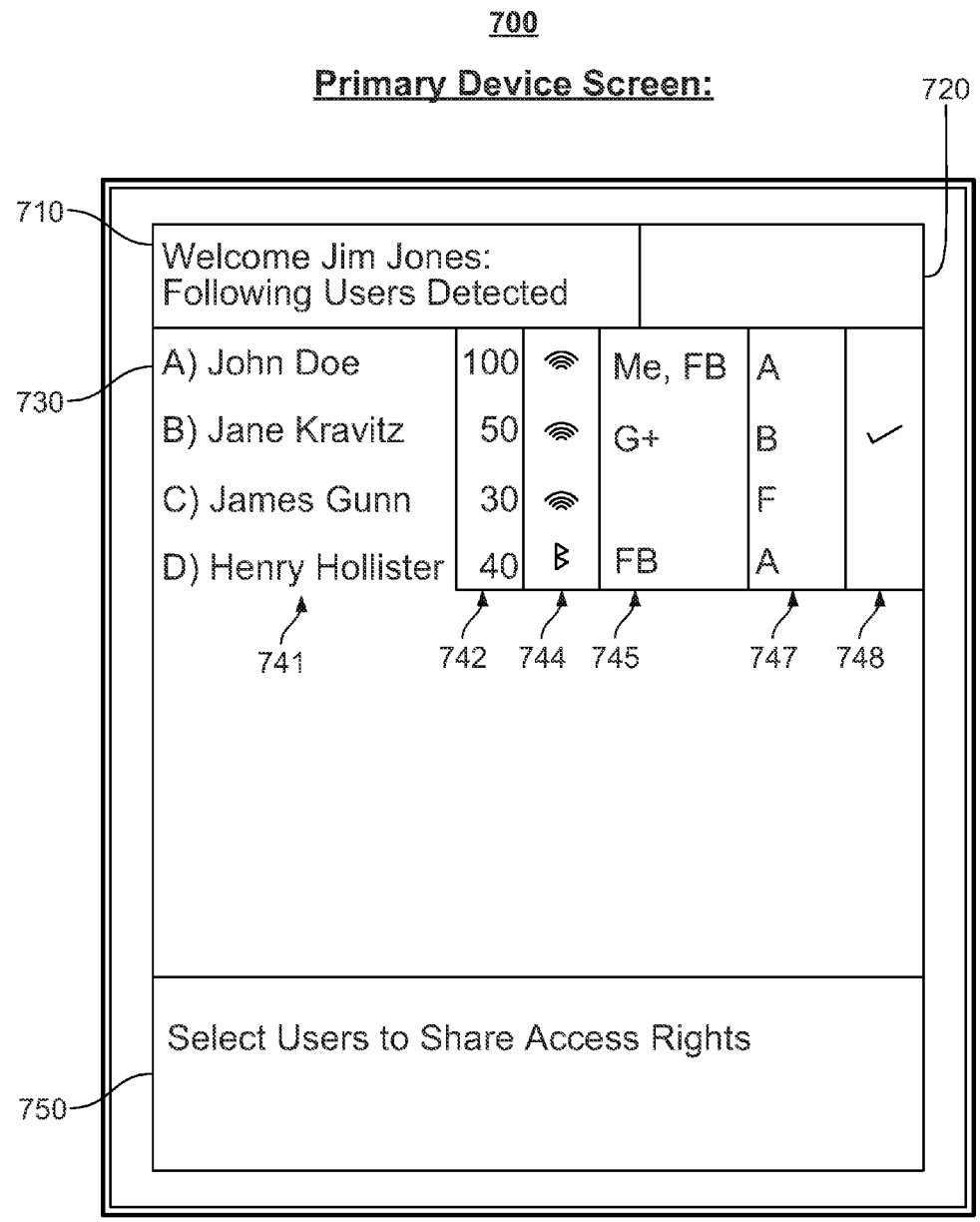
FIG. 7 illustrates a screen 700 that may be used to select users to temporarily assign or exchange access rights in accordance with some embodiments of the present disclosure.

FIG. 7 illustrates a screen 700 that may be displayed on an electronic device, such as a user device or a distribution point in accordance with some embodiments of the present disclosure. Screen 700 may include user region 710, advertisement region 720, detected users listing 730, user identities 741, indicator regions 742, 744, 746, 747, 748, message region 750, any other suitable regions or any combination thereof.

In some embodiments, screen 700 may be shown to a user by a first user device in response to: selection of an option from options region 126 of display screen 100 of FIG. 1, selection of an option from options 202 of display screen 200 of FIG. 2, or detecting a second user device, a distribution point, any other selection of an application implementing the DRM system, any other suitable trigger condition, or any combination thereof. For example, in response to receiving a user selection of a menu option from display screen 100 or 200, or detecting a second user device or distribution point, control circuitry 304 of a first user device may direct display 312 to show display screen 700.

User region 710 may display the user profile information associated with a user of the user device. For example, control circuitry 304 of a user device may receive an input from user input interface 310 indicating the identity of the user, and in response retrieve user profile information associated with the user, and direct display 312 to show the user profile information. User region 710 may include other information describing the status of the DRM system. For example, as illustrated in screen 700, a message is displayed indicating the user profile information corresponding to users of other user devices that have been detected.

Advertisement region 720 may display an advertisement based on user profile information, content authorization information, any other suitable information, or any combination thereof. In some embodiments, control circuitry 304 of a user device 300 may transmit user profile information or content authorization information to a webserver 430, receive an advertisement from the webserver 430, and direct display 312 of the user device to show the received advertisement.

User listings region 730 may display a selectable list of user listings corresponding to electronic devices that have been detected within a proximity. As described above, the physical proximity may be based on a physical proximity (e.g., between a first and second user device, between a first user device and distribution point, etc), or virtual proximity. The user listings region 730 may be organized into a grid, where each row of the grid corresponds to a detected user device. First column of the grid may show a list of user identities 741 corresponding to the detected devices. For example, control circuitry 304 of a first user device may receive user profile information or content authorization information corresponding to a second user of a second user device, extract a name or other suitable user profile information, and direct display 312 to show the extracted names in region 730. In some implementations, in response to receiving a selection of a selectable user listing shown in region 730, control circuitry 304 of an electronic device may show screen 800 to establish a content sharing relationship.

The other columns of the grid may include indicator regions 742, 744, 746, 747, or 748. In some embodiments, indicator region 742 may display information about the number of access rights that a user corresponding to the detected user device may be able to share. For example, control circuitry 304 of a first user device may retrieve content authorization information corresponding to users of the detected devices, determine the number of access rights included in the content authorization information corresponding to each user and direct display 312 to show the number of access rights in the row of indicator region 742 that corresponds to the user. In some embodiments, indicator region 744 may display an icon indicating the type of communication path that is used to communicate with a user device corresponding to a user. For example, the user devices corresponding to the first three rows of listings region 730 may be connected by a Wi-Fi path, as indicated by the corresponding wireless icon. For example, the fourth row of listings region 730 may be connected by a Bluetooth path, as indicated by the Bluetooth icon. For example, control circuitry 304 may determine the type of I/O path used to connect to a user device, select an icon corresponding to the I/O path, and direct display 312 to show the icon in a row of region 742 corresponding to the user of the user device. In some implementations, the reliability or signal strength corresponding to a wireless connection may be indicated by modifying an indicator icon. For example, control circuitry 304 may determine the RSSI corresponding to a user device, and direct display 312 to modify a displayed icon corresponding to the user device by adjusting shading of the icon, number of lines in the icon, or any other suitable modification.

In some embodiments, indicator region 745 may include information about whether a first user of the user device, indicated in region 710, is connected by a social network to a user corresponding to a detected device, listed in region 730. For example, the first row of indicator region 745 may include text "Me" and "FB" indicating that the first user may be connected to a second user corresponding to the first row of region 730, by two social networks, such as MySpace or Facebook. For example, the second row of indictor region 745 may include text "G+" indicating that the first user may be connected to a third user corresponding to the second row of region 730, by one social network such as Google+. For example, the third row of indicator region 745 may not include text, thereby indicating that the first user may not be connected to a fourth user corresponding to the third row. The fourth row of indicator region 745 may include text "FB" indicating that the first user may be connected to a fifth user corresponding to the fourth row of region 730. For example, the control circuitry 304 of a first user device may connect to a webserver 430 to access a social network account of the first user of the user device indicated in region 710, determine if the first user is connected to any of the users identified in region 730, and, based on the determination, direct display 312 of the first user device to display indicators in region 745.

In some embodiments, indicator region 747 may show a ranking value for each row of region 730, that indicates relevance of access rights that the user of the corresponding row is authorized to access. The ranking value may be on a relative or absolute scale, using a numerical metric, alphabetical metric, or any other suitable metric. The relevance of access rights may be based on user profile information, content authorization information, any other suitable information or any combination thereof. For example, control circuitry 304 of a first user device may receive preference information corresponding to the users listed in region 730. Control circuitry 304 may compare preference information of a first user of the first user device, with the received preference information corresponding to each of the users listed in region 730, calculate a relevancy metric for each of the users listed in region 730, and direct display 312 to show the relevancy metric as the ranking value in region 747. For example, control circuitry 304 may determine the relevancy metric by counting the number of matching terms between the first preference information corresponding to the first and another preference information corresponding to a different user.

In some embodiments, region 748 may show an icon that indicates whether the first user of a user device indicated in region 710 has established a content sharing relationship with a user corresponding to a row in region 730. For example, the checkbox in the second row of region 748 may indicate that the first user and third user corresponding to the second may have established a content sharing relationship. For example, control circuitry 304 may store a table of content sharing relationship information, and update the table as content relationships are created or terminated. Control circuitry 304 may direct display 312 of a first user device to update region 748 based on content sharing relationship information.

In some embodiments, message region 750 may show instructions to the first user of a user device indicated in region 710. For example, message region 750 may show text instructing the first user to select one of the users identified in region 730 to establish a content sharing relationship. For example, control circuitry 304 may direct display 312 of a first user device to show region 750.

Figure 8:
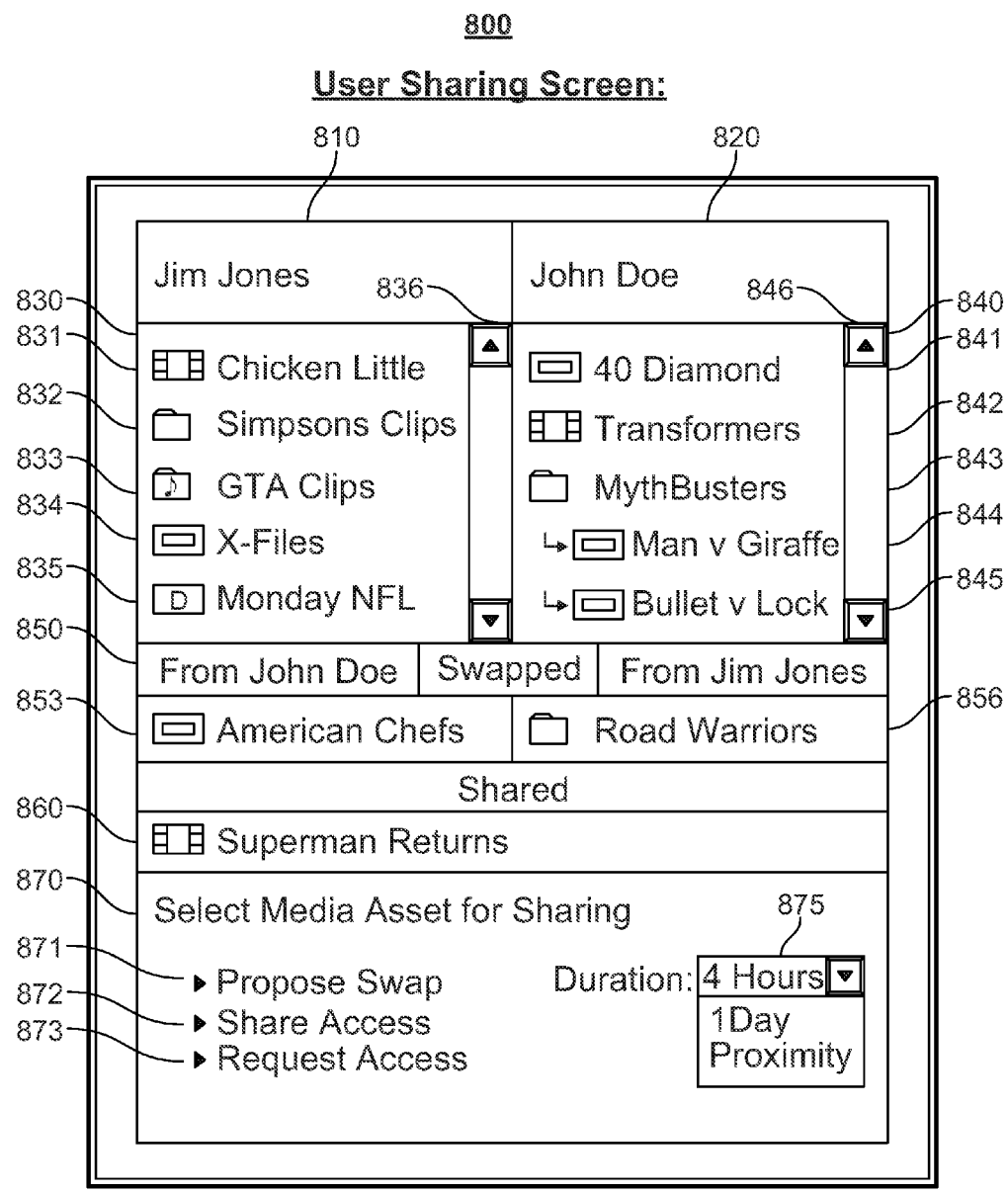
FIG. 8 illustrates a screen 800 that may be used to select content assets associated with access rights that may be temporarily assigned or exchanged in accordance with some embodiments of the present disclosure.

FIG. 8 illustrates a screen 800 that may be used to establish a content sharing relationship between a first and second user or used to select content assets associated with access rights that may be temporarily assigned or exchanged in accordance with some embodiments of the present disclosure. In some embodiments, screen 800 may be displayed on an electronic device, such as a user device or a distribution point. Screen 800 may include user regions 810 and 820, content listings region 830 and 840, exchanged access rights region 850, shared access rights region 860, and instructions region 870.

In some embodiments, display screen 800 may be shown to a user on an electronic device in response to selection of one of the users from region 730 of screen 700. For example, control circuitry 304 of an electronic device may receive a selection of a user from region 730 user input interface 310 and in response, direct display 312 of the electronic device to show screen 800.

First user region 810 and second user region 820 may display first user profile information associated with a first user of a first user device, and second user profile information associated with a second user of a second user device. For example, control circuitry 304 of a first user device may receive a selection of a selectable user listing of region 730 from user input interface 310. In response to the selection of the selectable user listing, control circuitry 304 may direct display 312 to show display 800, show a name from first user profile information corresponding to a first user of the first user device in region 810, or show a name from second user profile information corresponding to the second user corresponding to the selectable user listing in region 820.

First content listings region 830 may correspond to a first user indicated in first user region 810, and second content listings region 840 may correspond to a second user indicated in second user region 820. The content listings region may show a scrollable and/or selectable list of content assets listings that a corresponding user is authorized to access, based on content authorization information and access rights associated with the corresponding user. The listings of region 830 and 840 may be scrolled upward or downward in response to selection of the up or down arrows or selectable scroll bars 836 and 846 respectively. The selectable listings may include icons that indicate the type of content asset.

For example, content listings region 830 includes five content asset listings 831, 832, 833, 834 and 835, and content listings region 840 may include five content asset listings 841, 842, 843, 844, and 845. Content asset listings 831 and 842 may correspond to movies, as indicated by a movie icon. Content asset listings 832 and 843 may correspond to folders of content assets, as indicated by a folder icon. Content asset listing 833 may correspond to an album of audio clips as indicated by an album icon. Content asset listings 834 and 841 may correspond to television programs as indicated by a television icon. Content asset listing 835 may be an on-demand subscription as indicated by an on-demand icon. For example, control circuitry 304 of a first user device may retrieve content authorization information associated with a first user and second content authorization information associated with a second user, determine the content assets corresponding to each access right and display the direct display 312 to show the selectable content asset listings in regions 830 and 840.

In some implementations, selection of a content asset listing corresponding to a folder, album, list of subscriptions, or any other group of content assets, may cause the display of content asset listings included in the group. For example, in response to receiving a selection of content asset listing 843 from user input interface 310, control circuitry 304 of an electronic device may direct display 312 to update display screen 800 to show content asset listings 844 and 845 that may be included in a folder corresponding to content listing 843.

Exchanged access rights region 850 may show content asset listings corresponding to access rights that have been exchanged between the first and second users. First exchanged content asset listings region 853 may include a selectable and/or scrollable list of content asset listings that have been exchanged from the second user to the first user indicated in regions 820 and 810 respectively. Second exchanged content asset listings region 856 may include a selectable and/or scrollable list of content asset listings that have been exchanged from the first user to the second user indicated in regions 810 and 820, respectively. The term exchange may refer to a temporarily transfer of an access right from the first user to the second user. For example, after the temporary transfer of the access right, the first user may not be authorized to access the content asset corresponding to the transferred access right until the temporary transfer of the access right terminates. The temporary transfer may terminate after a period of predetermined time, or after the second user transfers the access right back to the first user. In such a use condition, access rights may be temporarily exchanged, similar to how library books may be exchanged.

For example, control circuitry 304 of a first user device may receive a user selection of a first content asset listing from region 830 and a second content asset listing from region 840, a command to exchange the first and second content asset listings. In response to receiving the selections and commands, control circuitry 304 may update first content authorization corresponding to a first user to disable an access right to the first content asset listing for the first user, and generate a temporary access right that enables a second user to access the first content asset listing. Control circuitry 304 of the first user device may then update second content authorization information associated with the second user to include the generated temporary access right. In some implementations, control circuitry 304 may transmit the temporary access right to the second user device associated with the second user. In some implementations, control circuitry 304 may transmit the temporary access right to a web server 430 that maintains content authorization information for all users. Control circuitry 304 of the first user device may also receive a temporary access right enabling the first user to access the second content asset listing from region 840 described above. In response to receiving the temporary access right, control circuitry 304 may update the first content authorization information of the first user to include the temporary access right.

Shared access rights region 860 may show content asset listings corresponding to access rights that have been temporarily shared between the first and second users. The term sharing may refer to a temporary assignment of an access right from the first user to the second user, or vice versa, that enables simultaneous access to the corresponding content asset. For example, a first user may temporarily share an access right to a movie to a second user so that the first user and second user may access the movie at the same time on each of the first user device or second user device corresponding to the first or second users, respectively. The temporary sharing may terminate after a period of time, or after the first user has completed access of the content asset, or after the second user has completed access of the content asset.

Instructions region 870 may show a list of selectable command listings 871, 872, and 873 that may be selected by a user to temporarily assign, exchange, or share access rights. The term assigning may refer to the temporary transfer of an access right for exchanging or sharing of access rights. In some implementations, an access right may be temporarily transferred from a first user to a second user without an equivalent exchange of an access right. For example, control circuitry of a first user device may temporarily transfer an access right from a first user to a second user, without transferring an access right from the second user to the first user. Selectable command listing 871 may be selected by a first user to propose an exchange of content asset listings. For example, control circuitry 304 of a first user device may receive command listing 871 from a first user to exchange a first content asset listing from region 830 and a second content asset listing from region 840 for exchange. Selectable command listing 872 may be selected by the first user to temporarily share access to a selected content asset listing from region 830 with the second user. For example, control circuitry 304 of a first user device may receive command listing 872 from a first user to temporarily share a first content asset listing from region 830 with a second user. Selectable command listing 873 may be selected by the first user to request a temporary access right from the second user for either exchange or sharing of a content asset listing from region 840. For example, control circuitry 304 of a first user device may receive command listing 873 from a first user to temporarily request a second content asset listing from region 840 from a second user. In some implementations, selectable region 875 may include a selectable duration to specify a predetermined time for the temporary access right. For example, the predetermined time duration of a temporary access right may be based on time (e.g., 4 hours, 1 day, length of the content asset, etc.) or conditioned on the first and second user devices being within some proximity (e.g., physical or virtual as previously described above). For example, control circuitry 304 of a first user device may receive a selection of a duration from region 875 from a first user to specify the duration of the temporarily assigning, sharing or exchange of the access right. Access to the content asset may be terminated or restricted after the duration on a user device receiving the temporary access right.

In some implementations, the duration may be equal to the length of the content asset. For example, the temporary access right may be granted to a second user of a second user device. If the duration is set to the length of the content asset, the second control circuitry of the second user device may access the content asset for a length of time needed to completely play back the content asset. Access to the content asset may be terminated or restricted on the second user device after the duration. For example, if the content asset is a twenty five minute long video clip, the temporary duration of the access right may be twenty five minutes. In some implementations, the duration may be conditioned on completion of playback of the content asset. For example, second control circuitry of the second user device may access the content asset until completing play back of the content asset. The second control circuitry may detect completion of playback by detecting an end-of-file marker in the content asset. Upon detecting completion of playback of the content asset, the second control circuitry may disable access to the content asset by, for example, updating second content authorization information to remove the temporary access right.

In some embodiments, access rights may be exchanged by dragging any of selectable content asset listings 831, 832, 833, 834, 835, 841, 842, 843, 844, or 845 between any of regions 830, 840, 853, 856, or 860. For example, to temporarily share content asset listing 831, control circuitry 304 of a first user device may receive a selection of selectable command listing 872, a selection of duration of 4 hours, a selection to drag content asset listing 831 from region 831 to 820. In response, control circuitry 304 may update first content authorization information corresponding to a first user to temporarily disable an access right corresponding to listing 831, and generate a temporary access right corresponding to listing 831 to transmit to a second user device corresponding to the second user. Access to the content asset may be terminated or restricted on the second user device after the duration. Further details of data structure of content authorization information and access rights will be discussed further below in reference to FIG. 11.

FIG. 9 illustrates a screen 900 that may be displayed on a user device or distribution point that may be part of a system that includes a distribution point in accordance with some embodiments of the present disclosure. Screen 900 may provide information about content assets corresponding to access rights that may be shared or transferred among a group of users each associated with user devices within a proximity. In some embodiments, screen 900 may be shown to a first user by a first user device in response to: selection of an option from options region 126 of display screen 100 of FIG. 1, selection of an option from options 202 of display screen 200 of FIG. 2, or detecting a second user device, a distribution point, any other selection of an application implementing the DRM system, any other suitable trigger condition, or any combination thereof. Screen 900 may include user region 910, selectable menu option 920, content asset listings region 930, and or content asset schedule region 940.

In some embodiments, user region 910 may display first user profile information associated with a first user of a first user device. For example, control circuitry 304 of a user device may receive an input from user input interface 310 indicating the identity of the user, and in response retrieve user profile information associated with the first user, and direct display 312 to show the user profile information.

In some embodiments, selectable menu option 920 may be a selectable list of users associated with user devices detected within a proximity of the first user device, as described previously above in reference to FIG. 5A-5C and 6. One or more users may be selected from the selectable list by a first user of the first user device, to filter regions 930 and 940 to show content asset listings that the selected users are authorized to access. For example, selectable menu option 920 may be a drop-down list, including the users indicated in region 730 of screen 700. In response to selection of a user, control circuitry 304 may update regions 930 and 940 to show content listings associated with the user.

In some embodiments, content asset listings region 930 may show a selectable list of content asset listings organized in a grid. The region 930 may include rank region 932, title region 934, ratings region 936 and viewer count region 938. Information region 932 may include rank information about the corresponding content asset listing. The rank information may indicate popularity of a corresponding content asset listing, relevance of the corresponding content asset listing to a user, or any other suitable rank information. In some implementations, the rank may be determined based on a count of users who are accessing or have accessed a content asset. For example, control circuitry 304 of a distribution point may store a count of users of a DRM system that have accessed a content asset listing, and determine a rank based on the stored count. Control circuitry 304 of the distribution point may then direct a display 312 to show the assigned rank next to the corresponding content asset. In some implementations, rank may be determined based on relevance to a user of a user device. For example, control circuitry 304 of a user device may determine relevance of a content asset listing to a first user indicated in region 910, based on preference information associated with the first user. Control circuitry 304 of the personal device may direct display 312 of the personal device to show rank next to the corresponding content asset.

Title region 934 may include a list of titles corresponding to content asset listings that may be accessed by users associated with user devices within a proximity. Ratings region 936 may include rating information corresponding to the content asset listings. Viewer count region 938 may include a total count of the number of access rights corresponding to a content asset listing, and a count of the number of those access rights that have been temporarily assigned. For example, control circuitry 304 of a distribution point may detect a plurality of user devices associated with the user, where each device is associated with a user. Control circuitry 304 may retrieve content authorization information associated with the user of each detected device, determine content assets corresponding to each content authorization, and process the information to show on screen 900. For example, control circuitry 304 may determine viewer information by counting the total number of access rights corresponding to an asset listing, and determining the number of those access rights that have been temporarily assigned. Control circuitry 304 may then direct display 312 to show the viewer count information in viewer count region 938 of region 930. Control circuitry 304 may determine rating information for each content asset listing and direct display 312 to show the rating information in region 936. Control circuitry 304 may determine title information for each content asset and direct display 312 to show the title information in region 934 of region 930.

Content asset schedule region 940 may show a schedule of content asset listings that may be accessed by a group of users within a proximity. In some embodiments, the content asset schedule may be displayed in a grid. For example, rows of the grid may correspond to the titles of the content asset listings. The columns of the grid may correlate to time periods in a schedule. The cells of a grid may indicate viewer count information by time period. For example, the total number of access rights for a particular content asset may be limited by the total number of users authorized to access that content asset. Because the number of users in a system may be greater than the limited number of access rights, it is possible that more users may request exclusive temporarily access during a specific time period than available access rights. If the limited number of access rights to a content asset listing is all temporarily assigned in a first time period, the viewer count schedule enables a user to request the access right in a second time period. For example, control circuitry 304 of a distribution point may maintain a total count of access rights to a particular content asset, and a count of those access rights that have been temporarily assigned in different schedule time periods. Control circuitry 304 may direct display 312 to show the display of region 940. Control circuitry 304 may update the display as temporary access rights expire, and as temporary access rights are assigned and exchanged.

In some embodiments, users may be able to temporarily assign or exchange access rights using the display screen 900, accessed from a distribution point. For example, control circuitry of a distribution point may detect and identify a first and second user, and in response retrieve first and second content authorization information associated with the first and second users. Control circuitry 304 of the distribution point may extract access rights from the retrieved first and second content authorization information, and display the listings in screen 900. In response to receiving an input from a first user requesting temporary assignment of an access right to a second user, control circuitry 304 of the distribution point may generate a temporary access right based on the selected access right listing. For example, control circuitry 304 may modify the access right to include personal user information of the second user, and an expiration date or timestamp. In some implementations, control circuitry of the distribution point may then transmit the access right to the second user device. In response to receiving the temporary access right, the second user device may enable access to the content asset. In some implementations, control circuitry of the distribution point may update second content authorization information stored on a web server to include the temporary access right. Control circuitry of a second user device may later retrieve the updated second content authorization information, and in response, enable play back of the content asset on the second user device.

Figure 10:
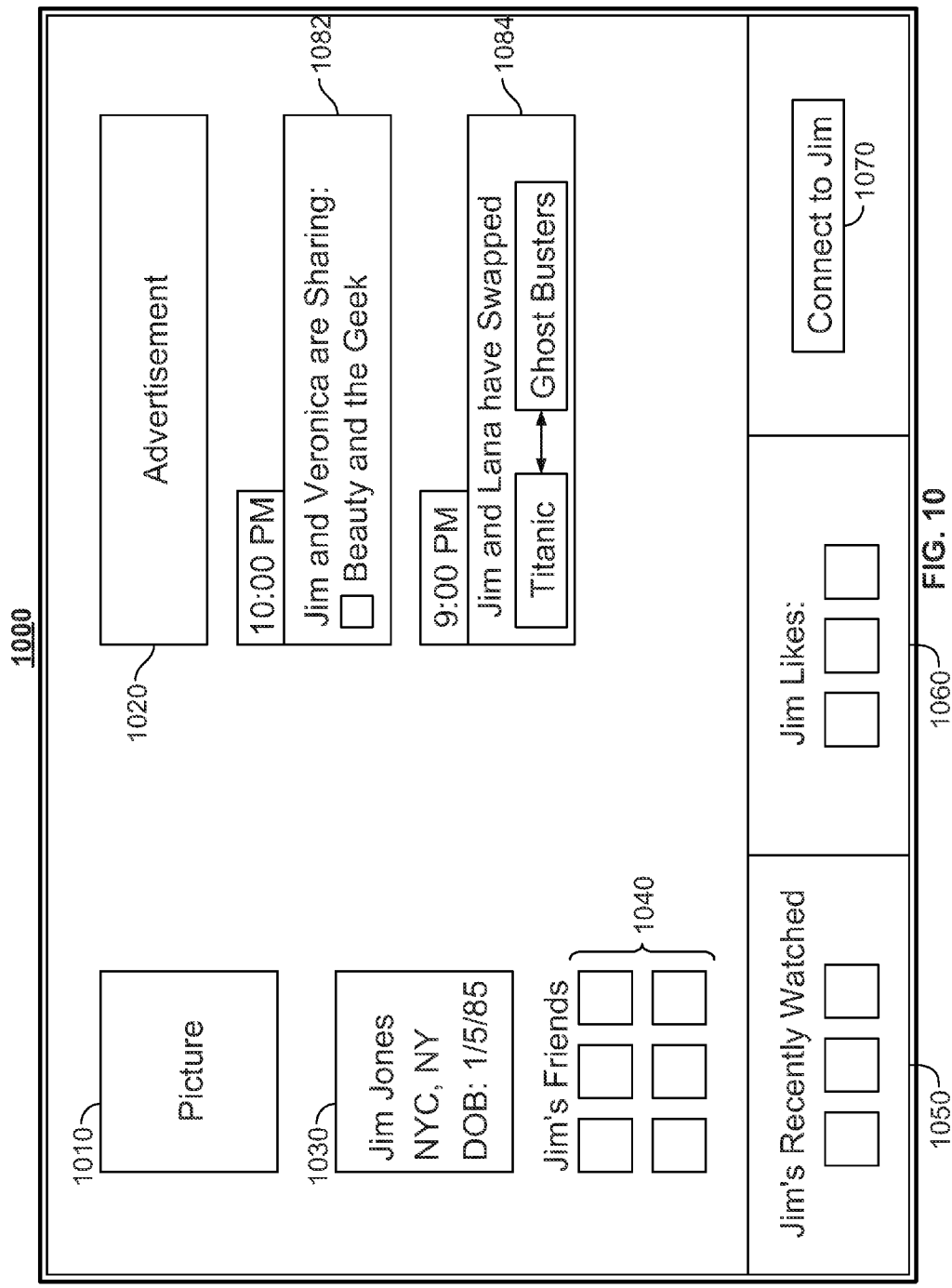
FIG. 10 illustrates a screen 1000 that may be displayed on a user device to show information about a user's account of a social network in accordance with some embodiments of the present disclosure.

FIG. 10 illustrates a screen 1000 that may be displayed on a user device to show information about a first user's account of a social network in accordance with some embodiments of the present disclosure. Screen 1000 may include picture region 1010, advertisement region 1020, user region 1030, friends region 1040, recently watched region 1050, favorites region 1060, selectable command option 1070, update region 1082, and update region 1084.

Picture region 1010 may include a photo, avatar, icon, any other suitable identifier of a user, or any combination thereof. User region 1030 may include user profile information about a user such as name, birthday, geographic location, or any other suitable user profile information. Friend region 1040 may include a selectable list of icons that correspond to other users that are connected to the first user in the social network. Recently watched region 1050 may include a selectable list of icons that indicate content assets that have been recently accessed by the first user. Favorites region 1060 may include a selectable list of icons corresponding to content assets that are commonly accessed by the user. Selectable command option 1070 may be used to establish a social network connection with the first user. In some embodiments, in response to selection of the selectable command option 1070, screen 800 may be displayed to a user. For example, control circuitry 304 of an electronic device may receive a selection of selectable command option 1070 and in response direct display 312 to show screen 800 of FIG. 8.

Update regions 1082 and 1084 may include information about temporary assignments of access rights to and from the first user. For example, update region 1082 includes information indicating that the first user and a different user are sharing an access right to a content asset at a certain time. For example, update region 1084 includes information indicating that the first user and a different user have exchanged access rights to two different content assets. Update regions 1082 and 1084 may include selectable icons corresponding to the different content assets. Advertisement region 1020 may include any suitable advertisement related to either the first user whose user profile is displayed on the screen 1000, a second user who is accessing screen 1000, any of the users indicated in region 840, any of the content assets shown in regions 1050, 1060, and 1082 or 1084, or any combination thereof.

Screen 1000 may be generated by a webserver 430 hosting a social network, and transmitted to a user device of a second user accessing the social network. For example, control circuitry 304 of a webserver 430 may retrieve first user profile information associated with a first user, and generate the display of screen 1000 based on the user profile information.

In some embodiments, a second user viewing screen 1000 may request a temporary access right to a content asset by selecting one of the selectable icons in any of regions 1050, 1060, 1082 or 1084 corresponding to a content asset. For example, control circuitry of a second user device associated with a second user may receive a selection of selectable icons, and in response transmit a request for a temporary access right to the webserver 430 hosting the social network. In some implementations, control circuitry of the webserver may automatically generate the temporary access right and update second content authorization information associated with the second user to include the temporary access right. In some implementations, control circuitry of the webserver may request confirmation from the first user who holds the requested access right, as to whether temporary access may be granted to the second user. In response to receiving confirmation from the first user, control circuitry of the webserver may generate the temporary access right and update second content authorization information to include the temporary access right.

Figure 11:
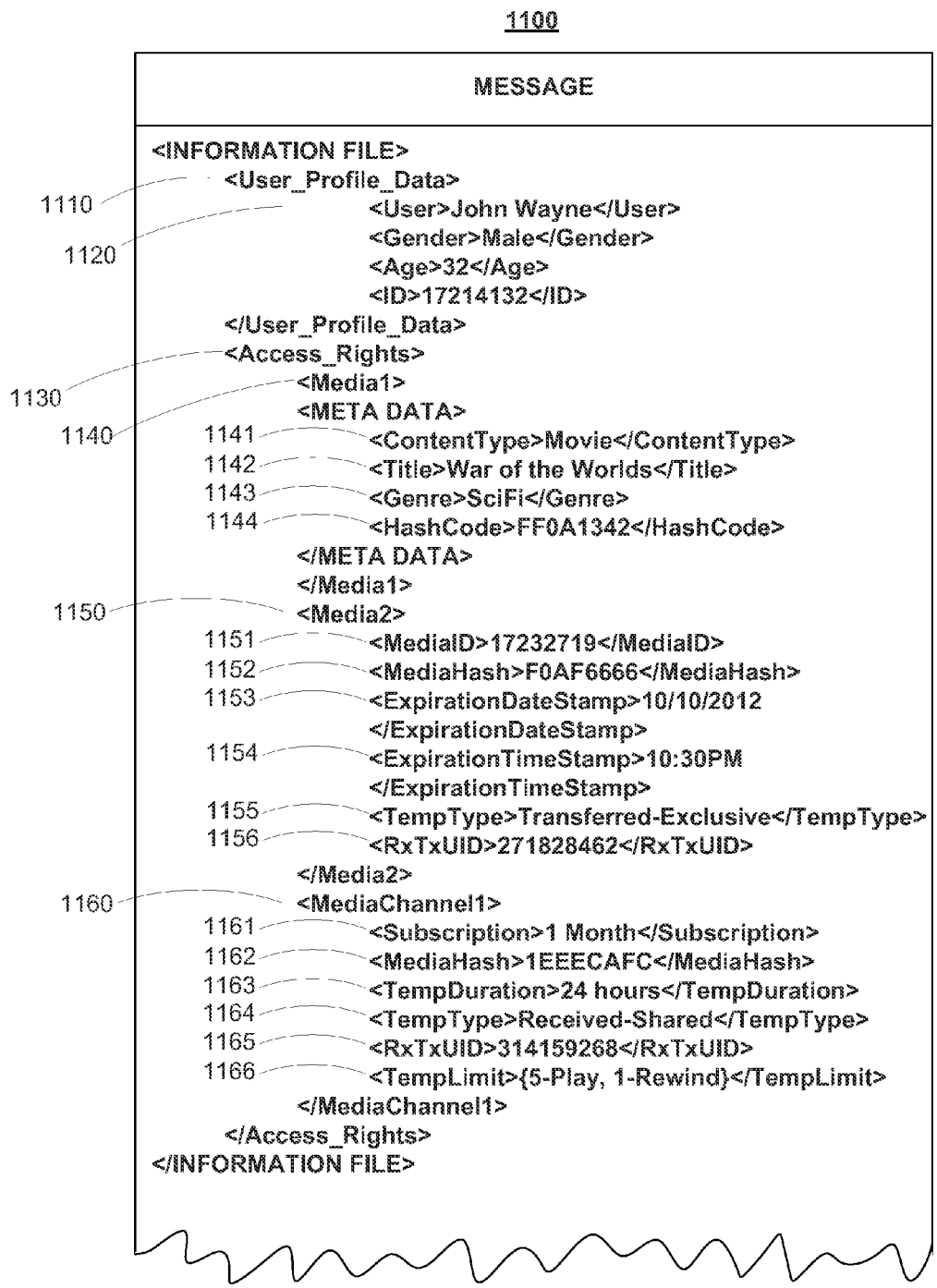
FIG. 11 illustrates a data structure 1100 that may be used to describe content authorization information and access rights in accordance with some embodiments of the present disclosure.

FIG. 11 illustrates a data structure 1100 that may be used to describe content authorization information and access rights in accordance with some embodiments of the present disclosure. The content authorization may be transferred between a first user device, second user device, distribution point, webserver, any other suitable device as described in reference to FIGS. 3 and 4 above, or any combination thereof. The content authorization information may include user profile information section 1110 containing user profile data 1120. The message may include section 1130 that contains access right and permission information. Section 1130 may include access right information for content assets 1140 and 1150 and content 1160.

User profile information section 1110 may be used to identify the user. Section 1110 may include descriptive information 1120 about a user such as user ID number, name, gender, and age. The user ID number may be a unique number assigned to identify a user. Examples of such ID numbers may include national identity card numbers, social security numbers, passport numbers, or a hash code generated from the full name and birthdate of the user.

In some implementations, user profile information may contain preference information about the kind of content preferred by a user (not shown in FIG. 11). This may include favorite instances of media guidance data such as genre or title.

Section 1130 may include content authorization information which describes access rights to content assets and content and permission information. The access rights may describe conditions of access to one or more content assets, one or more contents, or any combination thereof. The term subscription may refer to any grouping of contents and content assets that are provided by a content service provider for a period of time, and that depend on the terms of a service agreement between a user and the copyright owner or distributor. For example, a user may be subscribed to access the entire television series of Battlestar Galactica. For another example, the user may be subscribed to a sports broadcast package that grants access to a number of pay-per-view shows or number of sports channels.

A temporary access right that has been temporarily assigned, transferred or exchanged from a first user to a second user may include temporary duration information, type information, counterpart user ID information, or any combination thereof.

Temporary duration information may include a timestamp, datestamp or time duration. The timestamp and/or datestamp may indicate when the temporary access right may expire, or when a user assigned the temporary access right, last accessed a content asset corresponding to the temporary access or any other suitable date or time. The time duration may indicate the period during which a temporary access right may be valid, and may be referenced from any suitable datestamp or timestamp. Access to the content asset may be terminated or restricted on a user device after the duration indicated by the datestamp or timestamp. For example, the temporary duration may be referenced from a timestamp or datestamp indicating when the content asset associated with the temporary access right has last been accessed by the assigning user. For example, the temporary duration may correspond to the length of a content asset. The type information may indicate whether the temporary access right has been transferred from a first user, or received from a second user. The counterpart user ID information may include a user ID number as described above in reference to user profile information section 1110, that identifies to whom an access right was transferred, or the user from whom an access right was received.

Parental control information may include, for example, restricted television programs, restricted program titles, restricted channels, restricted ratings, restricted actors, restricted producers, restricted musical artists, restricted sponsors, restricted metadata terms, restricted themes, restricted genres, restricted categories, restricted time periods, restricted limits for purchasing content, and/or any other suitable restrictions. Parental control information may be independent of access right information. Parental control information may also be part of an access right as a content rating field in metadata.

The distributor restriction information may be a flag, identification code, hash code, any other suitable information, or any combination thereof. As an example, distributor restriction information may be part of information about an access right. The distributor restriction may be an identification number for a service provider. When the content authorization information is analyzed, a first user and a second user may not be able to view a content asset on common device if each user is subscribed to a different service provider.

Subscription information may include an ID number of the user, an account number with a service provider, a duration of the subscription, and a hash code. The ID number may be used to verify the identity of the user and the account number may be used to verify the services subscribed by the user. The duration may indicate the length of the subscription from a start date of service, expiration date of the service, time remaining available in the subscription, any other suitable duration information or any combination thereof. Access to a content asset may be terminated or restricted on a user device after the duration. The hash code may be a unique number assigned to the user that is compared with a value stored on a central server. The hash code is only valid for the duration of the subscription. After the subscription has expired, the user will need to renew the subscription and obtain a new hash code in order to continue maintaining access to the subscribed services.

Listing 1140 is an example of an access right for a content asset described by metadata, which may include information that describes a content asset such as the content type, title, genre, composer, author, performer, file size, and time length of the content asset. Listing 1140 provides an example access right described by metadata. The listing describes a content asset having a content-type 1141 of movie, title 1142 of "War of the Worlds," and genre 1143 of sci-fi. Hash codes may be used to securely protect metadata stored in plain text from tampering by unauthorized users.

For example, in response to receiving a purchase request from a user for an access right to the movie, "War of the Worlds," processing circuitry 306 of a shared media equipment device may generate the access right information shown in listing 1140. Processing circuitry 306 may compute the hash code 1144 as the result of hashing a concatenation of the metadata 1141-1143, using a hashing algorithm only usable by processing circuitry 306 of the shared media equipment device. The access right listing 1140 may then be transmitted to a user device of the purchasing user, or updated in an online service 330.

Modification of the plain text metadata in listing 1140 without modification of the hash code would corrupt the information in the listing 1140. When processing circuitry 306 next retrieves the content authorization information for the user, including access right listing 1140, it can verify whether the listing has been compromised, by re-computing the hash code based on meta-data 1141-1143, and comparing with hash code 1144. If the computed and stored hash code match, processing circuitry 306 determines that the user is authorized to access the content asset corresponding to listing 1140. If the hash codes do not match, processing circuitry 206 determines that the user is unauthorized to access the content asset, and may invoke a penalty on the user, such as a fine, or revocation of all access rights in the content authorization information of the user.

Listing 1150 is an example of a temporary access right for a content asset described without metadata. Temporary access right listing 1150 may correspond to an access right that has been temporarily transferred to another user. Listing 1150 includes an ID number 1151, hash code 1152, datestamp 1153, and timestamp 1154. ID number 1151 may be a unique ID number for the content asset. Datestamp 1153 and timestamp 1154 may correspond to temporary duration information, and indicate a date and time at which the access right expires. Access to a content asset may be terminated or restricted after a temporary duration indicated by datestamp 1153 and timestamp 1154. Type information 1155 may indicate type of access right listing. For example, the existence of a Type information field may indicate that the access right is a temporary access right that may have been temporarily assigned from a first user to a second user. Type information describing a temporary access right may include two parts. The first part may indicate whether the temporary access right is transferred to another user or received from another user. The second part may indicate whether the temporary access right is of an exclusive or shared type. An exclusive access right may limit access of a corresponding content asset to one user at a time, much like a book or object may be held by only one user at a time. A shared access may enable more than one user to access the corresponding content asset at a time. Counterpart user ID information 1156 may include a user ID number corresponding to a user to whom or from whom the access right is temporarily assigned.

Hash code 1152 may be a hashed value of an ID number, date information, time information, user profile information, type information, any other suitable content authorization information or subscription information or any combination thereof. The hash code may prevent tampering with the access right.

Referring back to the example above, processing circuitry 306 of a shared media equipment device may receive a request from a user to purchase an access right to the movie "War of the Worlds." In response to receiving the purchase request, processing circuitry 306 may generate the access right information shown in listing 1150. The ID number 1151 may correspond to the movie "War of the Worlds" in a media content source 416. Datestamp 1153 may refer to the date on which the access right expires. Timestamp 1154 may indicate a time when the access right expires. Type information 1155 and counterpart user ID information 1156 may indicate that the access right is a temporary access right that has been transferred to a user corresponding to user ID number 271828462. Processing circuitry 306 may compute hash code 1152 based on ID number 1151, datestamp 1153, timestamp 1154, type 1155, and counterpart ID 1156. The access right listing 1150 may then be transmitted to a user device of the purchasing user, or updated in an online service 430.

Modification of the plain text datestamp and timestamps in listing 1150 without modification of the hash code would corrupt the information in the listing 1150. When processing circuitry 306 next retrieves the content authorization information for the user, including access right listing 1150, it can verify whether the listing has been compromised, by re-computing the hash code and comparing it to the stored hash code 1152. If the computed and stored hash codes match, processing circuitry 306 determines that the user is authorized to access the content asset corresponding to listing 1140. If the hash codes do not match, processing circuitry 306 determines that the user is unauthorized to access the content asset.

Listing 1160 is an example of a temporary access right for accessing a channel. The listing may include subscription term 1161, which indicates the duration of the subscription. Other variants of 1161 may include one-time, annual or seasonal. Temporary duration information 1163 may be a time period as discussed in reference to FIG. 8 that indicates the duration of the temporary access right. Access to a content asset may be terminated or restricted on a user device after the duration of the subscription term 1161 or duration information 1163. Type information 1164 may indicate the type of temporary access right, as described above previously in reference to listing 1150. Counterpart user ID information 1165 may include a user ID number corresponding to a user to whom or from whom the access right is temporarily assigned. Operation Limit information 1166 may include an array of doublets that indicate an operation, (e.g., play, pause, fast forward, or rewind) and the number of times the operation may be carried out given the access right. Hash code 1162 may be a hashed value of an ID number, date information, time information, duration information, type information, user profile information, any other suitable content authorization information or subscription information or any combination thereof. In this case, only the hashed value is stored to reduce the amount of information about the access right that needs to be stored or transmitted. It should be understood that other variants and combinations of the information described previously may also be used to describe access rights to content assets.

For example, in response to receiving a purchase request from a user for an access right to a pay-per-view sports channel, processing circuitry 306 of a shared media equipment device may generate the access right information shown in listing 1160. Temporary duration 1163 may indicate that this temporary access right will expire after 24 hours. Access to a content asset may be terminated or restricted on a user device after the temporary duration 1163. Type information 1164 and counterpart user ID information 1165 may indicate that the access right is a shared temporary access right that has been received from a user 314159268. Operation Limit information 1166 may indicate that a content asset may be played back 5 times, and rewound once. Processing circuitry 306 may compute the hash code 1162 as the result of hashing a concatenation of the metadata fields such as the name of the channel, datestamp and timestamp of when the access right is purchased, date and timestamp of when the temporary access right is received, subscription duration 1161, temporary duration 1163, type information 1164, counterpart user ID 1165, and/or Operation limit information 1166. The access right listing 1160, including the hash code 1162 and subscription period 1161, may then be transmitted to a user device of the purchasing user, or updated in an online service 330. Access to a content asset may be terminated or restricted on a user device after the subscription duration 1161. In some embodiments, the access right information may be stored on the user device. Additional information may be stored on a web server 430, such as plain text information about the channel name and number, user identification information, subscription information, and the hash code 1162.

When processing circuitry 306 next retrieves the content authorization information for the user, including access right listing 1160, it can verify whether the listing has been compromised. It may retrieve content authorization information from the user device, and from the online service 330. It may compare the hash code stored in the user device with the hash code retrieved from the online service. If the hash codes match, processing circuitry 306 determines that the user is authorized to access the channel corresponding to listing 1160. If the hash codes do not match, processing circuitry 306 determines that the user is unauthorized to access the channel.

As shown above, the content authorization information for a user may include varying formats to describe access rights to content and content assets. Analysis of the access rights to determine the intersection of the access rights may require specific steps and additional information.

In some embodiments, the metadata that describe the content assets and content corresponding to an access right may be retrieved from a distributor of that content. The plain-text information in the metadata may then be analyzed. For example, fields of the metadata may be compared to determine overlap.

In some implementations, an access right may refer to a package of content assets or to a channel. For example, one access right may grant access to a specific sporting event. Another access right may grant access to the channel on which the sporting event is broadcast. When determining the intersection of access rights between a broad and narrow access right, the narrower access right may be selected for inclusion in the intersection.

Figure 12:
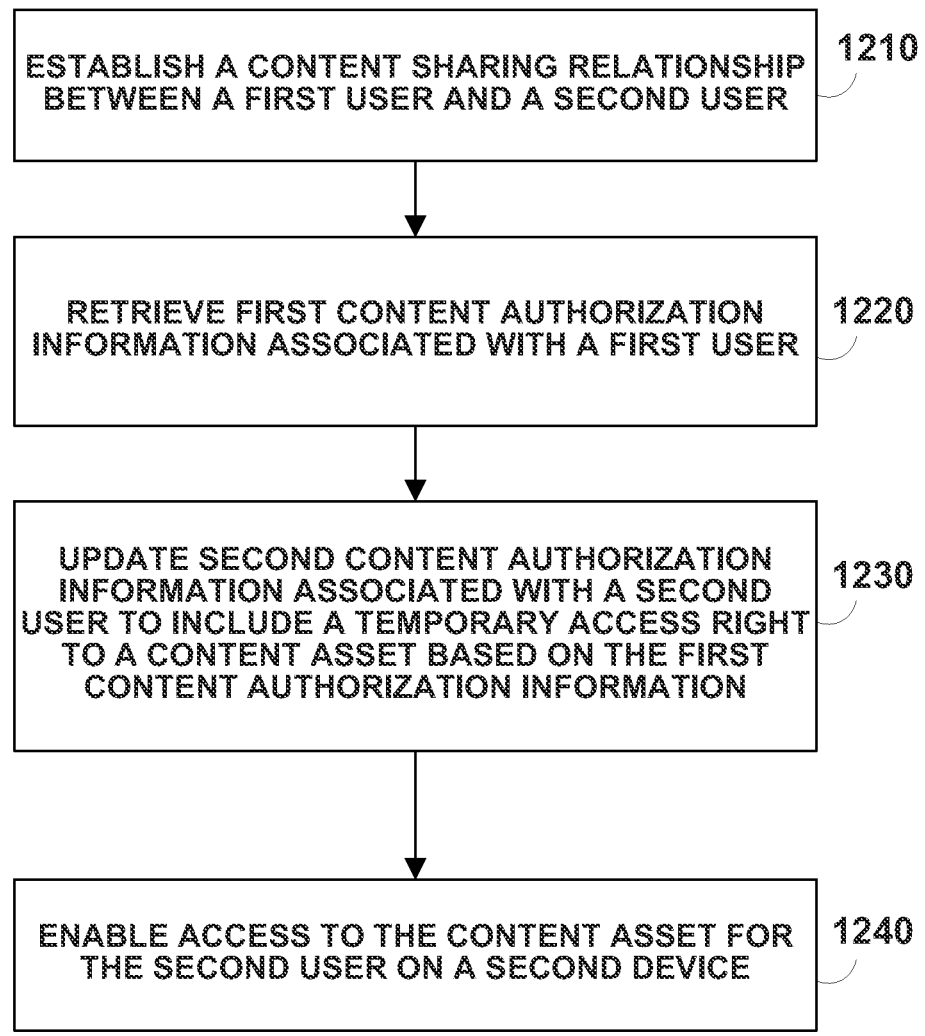
FIG. 12 illustrates an example of a flowchart of steps 1200 that may be performed by a system of devices to enable temporary assignment and exchange of access rights to content assets in accordance with some embodiments of the present disclosure.

FIG. 12 illustrates an example of a flowchart of steps 1200 that may be performed by a system of devices to enable temporary assignment and exchange of access rights to content assets in accordance with some embodiments of the present disclosure. At step 1210, a content sharing relationship is established between a first user and a second user. For example, first control circuitry 304 of a first user device may receive a user input from user input interface 310 indicating that the first user is requesting to establish a content sharing relationship with a second user associated with a second user device. The user input may be a selection of a selectable user listing from region 730 of screen 700 of FIG. 7, a selection of a selectable command option, or any other suitable user input.

At step 1220, first content authorization information associated with the first user is retrieved from a user device, a distribution point, a web server, or any other suitable device. In some embodiments, control circuitry 304 of an electronic device may retrieve content authorization information associated with a first user from a web server. In some implementations, the electronic device may be the first user device. For example, the first user may request to share an access right using a first user device. First control circuitry of the first user device may generate a temporary access right in response to receiving a user request from a first user to share an access right to a content asset with a second user. In some implementations, the electronic device may be a web server. For example, control circuitry of a web server may retrieve first and second content authorization information associated with a first user and second user in a content sharing relationship, and generate a temporary access right based on first content authorization information, in response to receiving a request to assign a temporary access right from a first user to a second user.

At step 1230, second content authorization information associated with a second user may be updated to include the temporary access right generated at step 1220. For example, control circuitry 304 of the first user device may transmit the temporary access right to the second user device. Control circuitry 304 of the second user device may retrieve the generated access right and update the second content authorization information. For example, control circuitry of a web server may update second content authorization information to include the generated temporary access right.

At step 1240, access to the content asset corresponding to the temporary access right may be enabled for the second user on the second user device. For example, second control circuitry of the second user device may access the content asset using the temporary access right. As described above, the access right may expire once play back of the content asset associated with the temporary access right has expired. For example, second control circuitry of the second user device may maintain access to the content asset until an end-of-file marker has been detected during access of the content asset.

Figure 13:
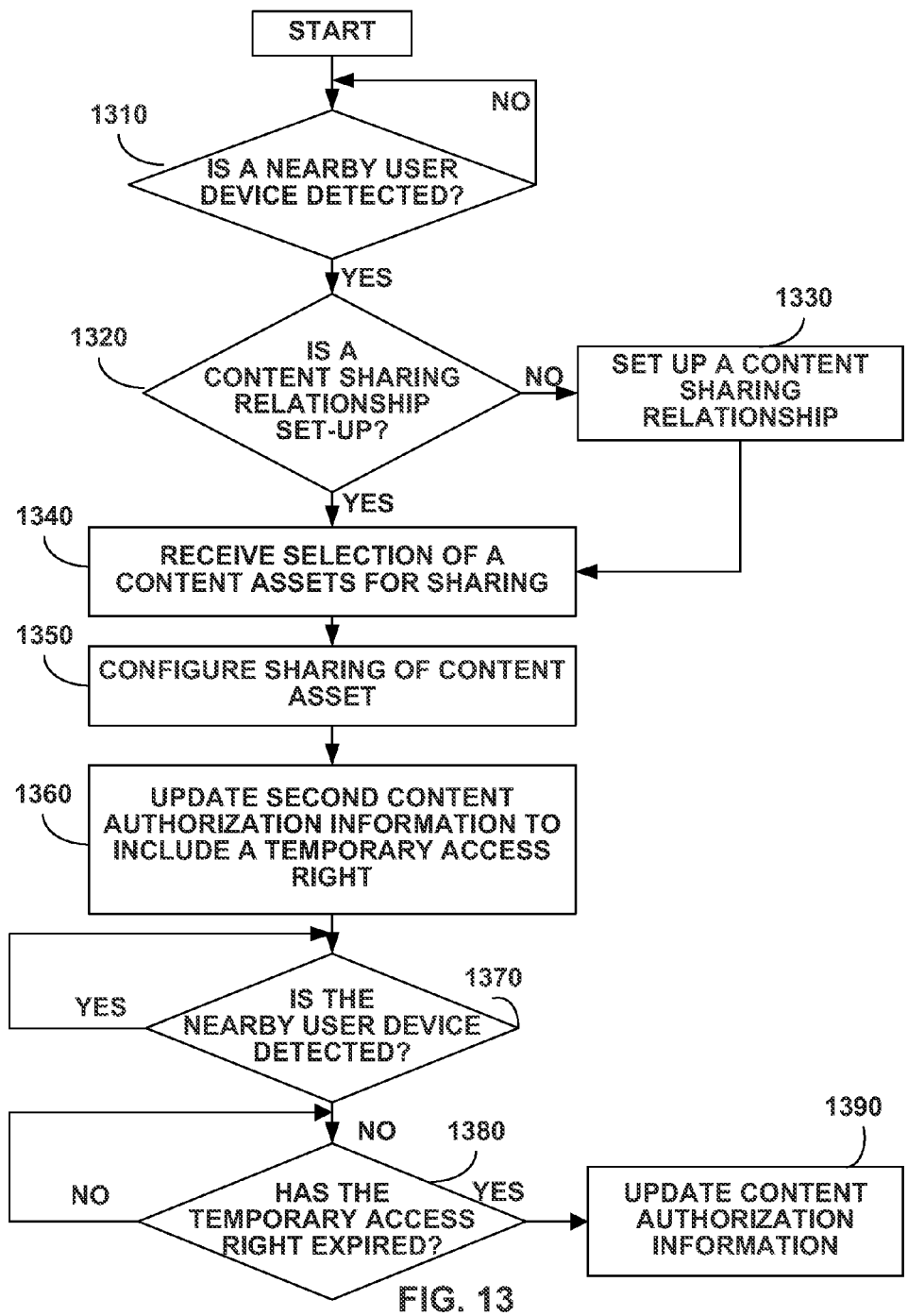
FIG. 13 illustrates an example of a flowchart of steps 1300 that may be performed by a user device to temporarily assign or exchange access rights to content assets in accordance with some embodiments of the present disclosure.

FIG. 13 illustrates an example of a flowchart of steps 1300 that may be performed by a user device to temporarily assign or exchange access rights to content assets in accordance with some embodiments of the present disclosure. At step 1310, a first user device associated with a first user detects whether there is any nearby user device associated with another user. For example, control circuitry 304 of a first user device may use wireless detection techniques to detect a nearby user device. If no nearby user devices are detected, the process polls on step 1310. If nearby user devices are detected, the process proceeds to step 1320.

At step 1320, the first user device determines whether a content sharing relationship has been established. For example, control circuitry 304 of the first user device may determine whether any content relationships have been set up with another user or user device. The control circuitry may query storage 308 for records of a content sharing relationship. If a content sharing relationship is set up, the process proceeds to step 1340. If there is no content sharing relationship set up, the process proceeds to step 1330. In some embodiments, steps 1320 and 1330 may be skipped and no content sharing relationship may be set up.

At step 1330, a content sharing relationship is set up. For example, as described in reference to step 1210 above, control circuitry 304 of the first user device may set up a content sharing relationship in response to receiving a user input from input interface 310 indicating a request from the first user to set up a content sharing relationship. Control circuitry 304 of the first user device may direct display 312 to show any of screens of FIG. 7, FIG. 8, FIG. 9 or FIG. 10 to the user. Control circuitry 304 may receive any suitable command from the screens to set-up the content sharing relationship as described above in reference to FIG. 7, FIG. 8, FIG. 9, or FIG. 10.

At step 1340, a selection of a content asset for temporary assigning is received. For example, control circuitry of a first user device may receive an input from the first user indicating a selection of a content asset listing from region 830 of screen 800 of FIG. 8, any of the selectable icons of screen 1000 of FIG. 10, or any other suitable selection of a content asset listing.

At step 1350, the sharing of the content asset may be configured. For example, the duration and type of temporary access right may be set. For example, control circuitry 304 of a first user device may receive from user input interface 310 a selection of configuration settings as described above in reference to FIG. 8. Access to a content asset may be terminated or restricted on a user device after the duration of the temporary access right.

At step 1360, second content authorization is updated to transfer or assign an access right. For example, a shared temporary access right, generated from first content authorization information of the first user, may enable a first user and second user to each access a content asset associated with an access right from the first content authorization information. Control circuitry 304 of the first user device may generate a temporary access right based on the first content authorization information and update the second content authorization information to include the temporary access right. In some implementations, the control circuitry 304 of the first user device may update the second content authorization information by transmitting the temporary access right to the second user device. In response to receiving the temporary access right, the second user device may update locally stored second content authorization information. In some implementations, the first user device may update the second content authorization information by transmitting the temporary access right to a central server that maintains content authorization information for a number of users. In some implementations, control circuitry 304 of the first user device may automatically generate the temporary access right, and/or update the second content authorization information in response to receiving a request from a user to temporarily assign an access right to the second user.

In some embodiments, first content authorization information may be updated. For example, a transferred and exclusive temporary access right may disable access to a content asset for a first user, while temporarily enabling access to the content asset for a second user. Control circuitry 304 of the first user device may update the first content authorization information associated with the first user to disable access to the content asset.

At step 1370, control circuitry 304 of the first user device determines whether the second user device corresponding to the second user to whom a temporary access right was assigned is still detected within a proximity. If the second user device is still detected, the process polls on at step 1370. If the second user device is not detected, the process proceeds to step 1380. In some embodiments, the second user device corresponding to the second user to whom the temporary access right was assigned, may determine whether the first user device is still within a proximity. For example, control circuitry 304 of the second user device may determine whether the first user device is still detected by using wireless detection techniques, any other suitable detecting technique, or any combination thereof. If the first user device is not detected, the process proceeds to step 1380.

At step 1380, control circuitry 304 of the first user device determines whether the temporary access right has expired. In some embodiments, at step 1380, control circuitry 304 of the second user device determines whether the temporary access right has expired. Control circuitry of a user device may determine if the temporary access right has expired by examining the temporary duration information. For example, control circuitry may compare an expiration datestamp and expiration timestamp stored in a temporary access right a current datestamp and timestamp. Access to a content asset may be terminated or restricted on a user device after the duration of the temporary access right. If the temporary access right has expired, the process proceeds to step 1390. If the temporary access right has not expired, the process polls on step 1380. In some implementations, control circuitry of a user device may maintain access to the content asset corresponding to the temporary access right until after play back of the content asset has completed. For example, as described above, the control circuitry of a user device may determine whether play back of a content asset has completed by detecting an end-of-file marker. In some implementations, control circuitry of the second user device may play back, fast forward, rewind, or pause the content asset any number of times before the end-of-file marker is detected. In some implementations, control circuitry of the second user device may play back, fast forward, rewind or pause the content asset a limited number of times based on the temporary access right. For example, control circuitry of the second user device may retrieve the Operation Limit information 1166 of an access right listing and determine the number of times an operation may be performed.

At step 1390, content authorization information is updated in response to determining that the temporary access right has expired. In some embodiments, control circuitry 304 of the first user device may update first content authorization information associated with the first user to restore access to the content asset corresponding to the temporary access right. For example, if the temporary access right was assigned to another user and is the exclusive type, access to the content asset by the first user should be restored upon expiration of the temporary access right. Control circuitry 304 of the first user device may update first content authorization restore access to the content asset for the first user on the first user device by updating a modified access right, as described previously reference to step 1360. In some embodiments, control circuitry 304 of the first user device updates second content authorization information in response to determining that the access right has expired. For example, control circuitry 304 of the first user device may transmit a command to a central server that maintains content authorization information for a number of users to remove the temporary access right from the second content authorization information.

In some embodiments, control circuitry 304 of the second user device may update second content authorization information to remove the access right as described above in reference to step 1380, and/or disable access to the corresponding content asset for the second user. In some implementations, the second user device may continue to access the content asset after expiration of the temporary access right or termination of the content sharing relationship for a duration that corresponds to the length of the content asset or at least long enough to complete access of the content asset. As an example, a user may have been granted a temporary access right for four hours. At the end of four hours, the temporary access right expires. However if the second user device is still accessing the content asset when the temporary access right expires, the second user device may continue to access the content asset until access of the content asset is complete. For example, control circuitry 304 of a second user device may determine that a temporary access right has expired, and that the content asset is still being accessed for playback. Control circuitry 304 of the second user device may continue to access the content asset until play back is complete. Once access of the content asset is completed, and the temporary access right has expired, control circuitry of the second may disable access to the content asset and update second content authorization information to remove the temporary access right.

Figure 14:
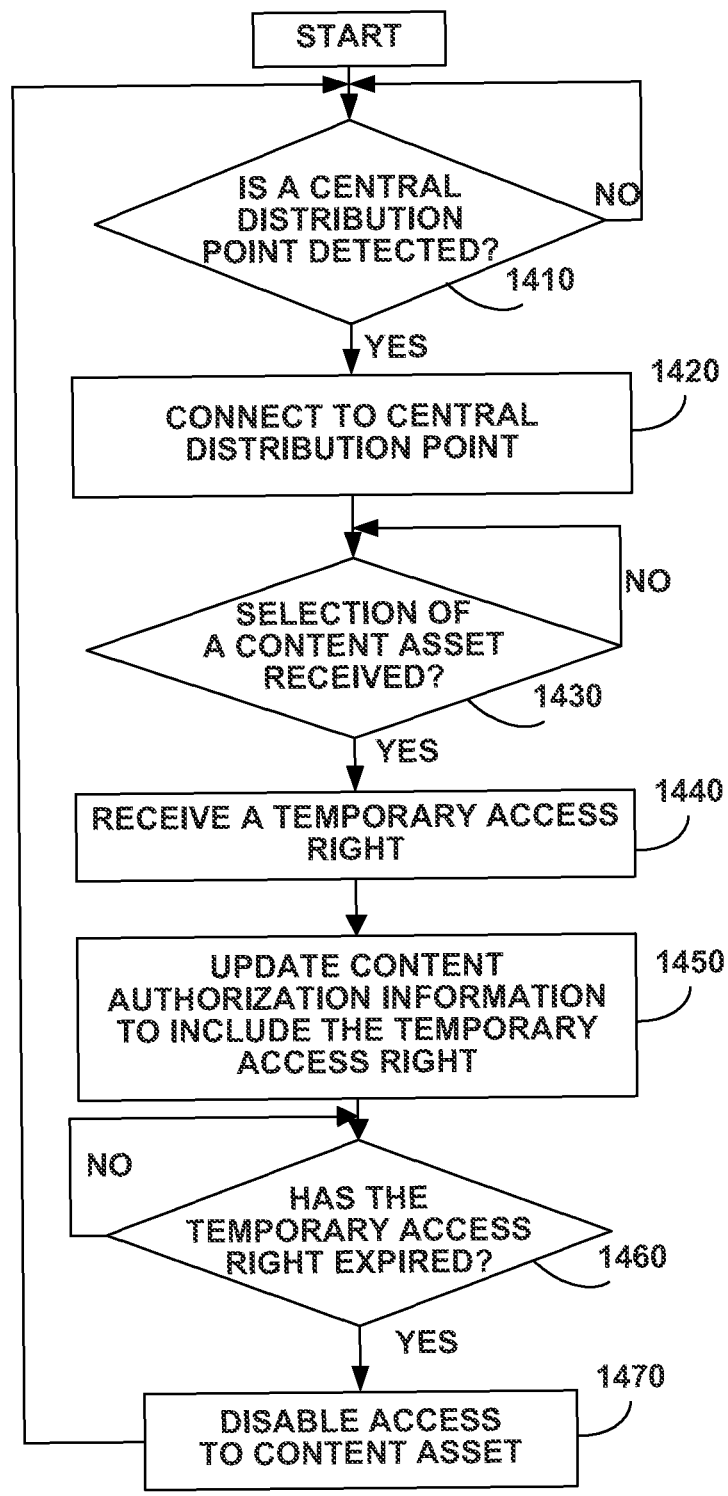
FIG. 14 illustrates an example of a flowchart of steps 1400 that may be performed by a user device, in a system including a distribution point, to temporarily assign or exchange access rights to content assets in accordance with some embodiments of the present disclosure.

FIG. 14 illustrates an example of a flowchart of steps 1400 that may be performed by a user device, in a system including a distribution point, to temporarily assign or exchange access rights to content assets in accordance with some embodiments of the present disclosure. At step 1410, control circuitry of a first user device determines whether a distribution point is nearby. For example, control circuitry 304 of the first user device may use wireless detection techniques to detect a nearby distribution point. If a distribution point is detected, the process proceeds to step 1420. If a distribution point is not detected, the process polls on step 1410.

At step 1420, the first user device connects to the distribution point. In some embodiments, control circuitry 304 of the user device may initiate a connection with the distribution point using any suitable communications path as described in reference to FIG. 4. In some embodiments, control circuitry 304 of the distribution point may initiate a connection with the first user device using any suitable communications path as described in reference to FIG. 4. In some implementations, the control circuitry 304 of the first user device will transmit first content authorization to the distribution point after connecting to the distribution point. After connecting to the distribution point, control circuitry 304 of the first user device may receive information, such as content authorization information or user profile information, corresponding to other users of other associated user devices that are connected to the distribution point. For example, control circuitry 304 of the first user device may receive the information and direct the display 312 to show any of display screens 700 of FIG. 7, 800 of FIG. 8 or 900 of FIG. 9.

At step 1430, control circuitry 304 of the first user device receives a selection of a content asset. In some embodiments, the selection of a content asset is received from user input interface 310 from a user selection of a content asset listing from region 830 of screen 800 of FIG. 8, any of the selectable listings in region 930 or 940 of FIG. 9, any of the selectable icons of screen 1000 of FIG. 10, or any other suitable selection of a content asset listing. In a selection of a content asset listing has been received, the process proceeds to step 1440. If a selection has not been received, the process polls on step 1430.

At step 1440, control circuitry 304 of the first user device receives a temporary access right from the distribution point that enables access to the requested content asset from step 1430.

At step 1450, control circuitry 304 of the first user device updates first content authorization stored locally. In some embodiments, control circuitry 304 may not receive the temporary access right as described in step 1440 nor update the content authorization information as the first content authorization information may be managed on a central server, and the temporary access right may be transmitted to the server.

At step 1460, control circuitry 304 of the first user device determines whether the received temporary access right has expired. For example, control circuitry 304 of the first user device may determine whether the temporary duration indicated in the temporary access right has expired. If the control circuitry 304 determines that the temporary access right has expired, the process proceeds to step 1470. Otherwise, the process polls at step 1460.

At step 1470, in response to determining that the temporary access right has expired, control circuitry 304 of the first user device disables access to the content asset. In some embodiments, control circuitry 304 of the first user device may update first content authorization information to remove the temporary access right. In some embodiments, if control circuitry of the first user device is actively accessing the content asset, for example actively playing back the content asset, the control circuitry may continue to access the asset until playback of the asset is complete, even after the temporary access right has expired.

Figure 15:
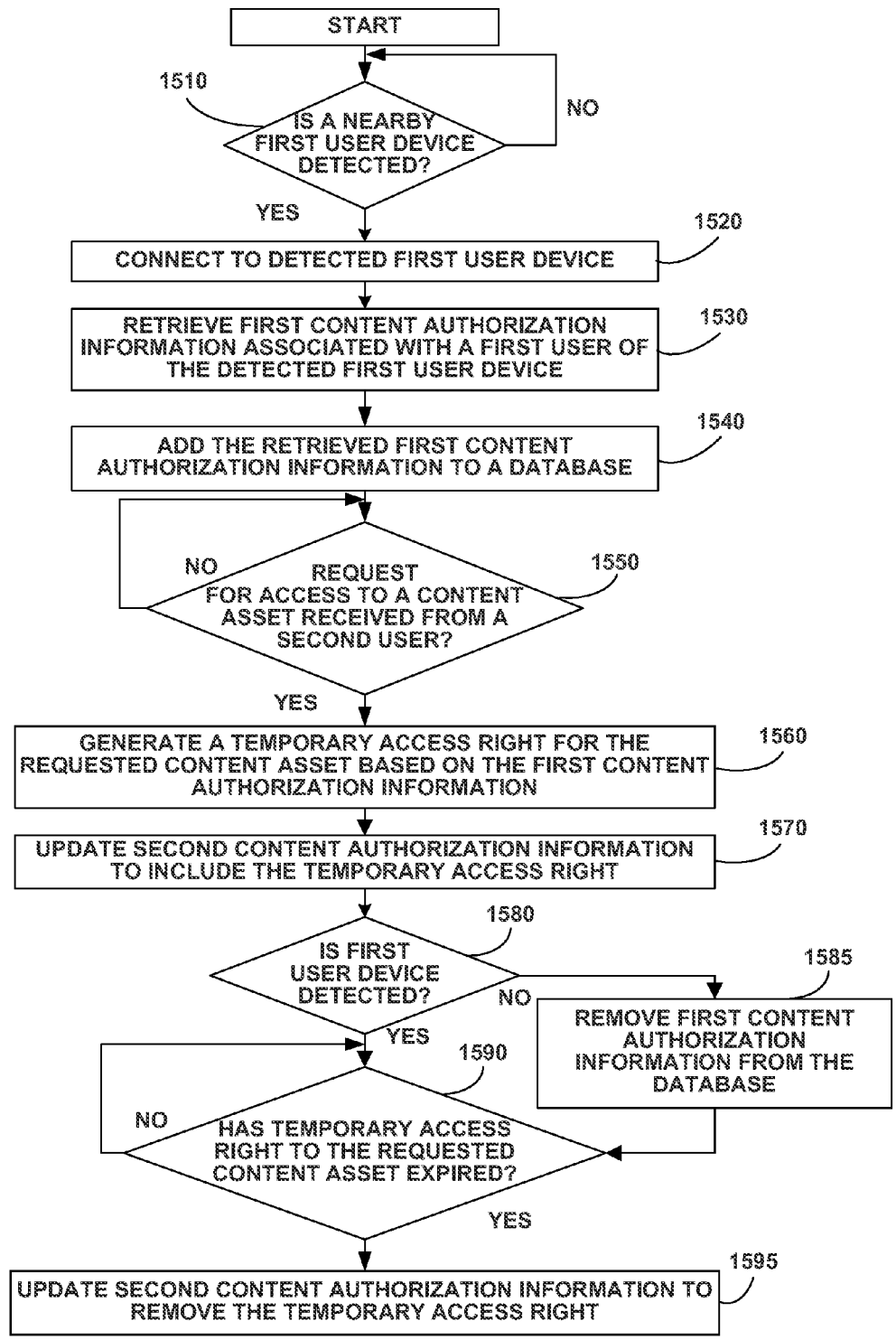
FIG. 15 illustrates an example of a flowchart of steps 1500 that may be performed by a distribution point to temporarily assign or exchange access rights to content assets in accordance with some embodiments of the present disclosure.

FIG. 15 illustrates an example of a flowchart of steps 1500 that may be performed by a distribution point to temporarily assign or exchange access rights to content assets in accordance with some embodiments of the present disclosure. At step 1510, control circuitry 304 of the distribution point may detect a nearby first user device. For example, control circuitry 304 may use wireless detection techniques or any other suitable techniques to detect a nearby device. If a nearby device is detected, the process proceeds to step 1520, otherwise the process polls at step 1510.

At step 1520, control circuitry 304 of the distribution point connects to the detected first user device across any suitable communications path as described in reference to FIG. 4. In some embodiments, the control circuitry 304 of the distribution point initiates the connection. In some embodiments, the control circuitry 304 of the distribution point receives a request for a connection from a user device.

At step 1530, control circuitry 304 of the distribution point retrieves first content authorization information associated with a first user of the detected first user device. In some embodiments, control circuitry 304 of the distribution point may retrieve the first content authorization information from the first user device. In some embodiments, control circuitry 304 of the distribution point may retrieve the content authorization information from an web server 430.

At step 1540, control circuitry 304 of the distribution point adds the retrieved content authorization information to a central database. For example, control circuitry 304 of may add access rights and user profile information as described in reference to FIG. 11, to a database stored in storage 308 of the distribution point. In some implementations, the database may be stored on a web server 430 that is located separate from the distribution point. The database may tabulate and count the number of access rights and associated content assets that are accessible by users of devices connected to the distribution point. In some implementations, control circuitry 304 of the distribution point may transmit some information from the database to a connected user device to enable generation and display of any of the screens of FIG. 7, FIG. 8, FIG. 9 or FIG. 10 on the user device. In some implementations, control circuitry 304 of the distribution point may generate using the information stored in the database to generate and show on display 312 any of the screens of FIG. 7, FIG. 8, FIG. 9 or FIG. 10.

At step 1550, control circuitry of the distribution point receives a request to access a content asset from a second user. In some implementations, control circuitry 304 of the distribution point may receive the request from a second user device associated with the second user. In some implementations, control circuitry 304 of the distribution point may receive the request from user input interface 310. In a request to access a content is received, the process proceeds to step 1560, otherwise the process polls at step 1550.

At step 1560, control circuitry of the distribution point generates a temporary access right for the requested content asset based on first content authorization information. For example, the second user may request access to a content asset corresponding to an access right that is included in first content authorization information associated with the first user.

At step 1570, control circuitry 304 of the distribution point updates second content authorization information associated with the requesting second user to include the temporary access right. In some embodiments, control circuitry 304 of the distribution point may transmit the temporary access right to the second user device. In some embodiments, control circuitry 304 of the distribution point may update the second content authorization information by transmitting the temporary access right to a web server 430 that maintains the content authorization information for several users. In some implementations, control circuitry 304 of the distribution point may automatically generate the temporary access right, and/or update the second content authorization information in response to receiving a request from a first user to temporarily assign an access right to a second user. In some implementations, control circuitry 304 of the distribution point may automatically generate the temporary access right, and/or update the second content authorization information in response to receiving a request from the second user to obtain a temporary access right to a content asset associated with an access right of the first user.

At step 1580, the control circuitry 304 of the distribution point determines whether the first user device is still detected within the proximity. If the first user device is detected within the proximity, the process proceeds to step 1590. If the device is not detected, the process proceeds to step 1585.

At step 1585, control circuitry 304 of the distribution point removes first content authorization associated with the first user from the database. For example, the control circuitry 304 may delete the first content authorization information from the database in storage 308. The process then proceeds to step 1590.

At step 1590, control circuitry 304 of the distribution point determines whether the temporary access right corresponding to the content asset requested by the second user has expired. For example, the control circuitry 304 may compare the expiration datestamp and timestamp with a current datestamp and timestamp to determine if the temporary access right has expired. In some implementations, control circuitry 304 may compute an expiration date and time based on the temporary duration information and a timestamp and/or datestamp that indicates when the temporary access was enabled. Access to a content asset may be terminated or restricted on a user device after the duration indicated by the temporary duration and timestamp and/or datestamp. If control circuitry 304 determines that the access right has expired, the process may proceed to step 1595, otherwise the process may poll on step 1590.

At step 1595, control circuitry 304 of the distribution point may update second content authorization information to remove the temporary access right and/or disable access to the content asset by the second user or second user device. In some implementations, the control circuitry 304 may update content authorization information stored in a database on storage 308. In some implementations, the control circuitry 304 may transmit a command to the second user device to remove the temporary access right from second content authorization information stored on the device.

It will be understood that the foregoing is only illustrative of the principles of the disclosure, and that various modifications may be made by those skilled in the art without departing from the scope and spirit of the disclosure. It will also be understood that various display, selection and sorting techniques may be made available to the user and examples used herein are only for convenience. Those skilled in the art will appreciate that the disclosure may be practiced by other than the described embodiments, which are presented for purposes of illustration rather than of limitation, and the disclosure is limited only by the claims that follow.

What is claimed is:

1. A method comprising:
   detecting a second user device within a proximity of a first user device, the first user device associated with a first user, and the second user device associated with a second user;
   receiving input from a first one of the first and second users, with a first one of the first and second devices, that initiates a transfer of content authorization information to a second one of the first and second devices, associated with a second one of the first and second users;
   responsive to detecting the second user device and receiving input, receiving at the first user device content authorization information, wherein the content authorization information enables access to a content asset on the second user device which the first user device is not authorized to access;
   enabling access to the content asset on the first user device;
   determining that the first user device leaves the proximity of the second user device;
   in response to determining that the first user device leaves the proximity, maintaining access to the content asset on the first user device for an amount of time determined based on a length of the content asset.

2. The method of claim 1 wherein the predetermined amount of time is a user specified duration or a duration of time required to play back the content asset, and further comprising:

terminating, in response to determining that the predetermined time has elapsed, access to the content asset on the first user device.

3. The method of claim 1 wherein the proximity is based on a first physical location of the first user device and a second physical location of the second user device determined by a global position system (GPS), cell tower triangulation or a wireless detection range of the first and second user device.

4. The method of claim 1 wherein the proximity is based on connection of the first user device and second user device to an active session of an online social network service.

5. The method of claim 1, further comprising:
displaying on the first user device, a selectable list of users, including the first user and the second user,
wherein the input is a request from the first user to assign a temporary access right to the second user; and
in response to the input from the first user, generating the temporary access right.

6. The method of claim 1, further comprising:
displaying on the first user device, a selectable list of users, including the first user and the second user,
wherein the input is a request from the first user to receive a temporary access right from the second user,
wherein the receiving the content authorization information at the first user device is performed in response to the input from the first user.

7. The method of claim 1 wherein the content authorization information comprises access rights, metadata, user profile information, operation limit information or a hash code.

8. The method of claim 1 further comprising:
receiving from the second user device a request to disable a temporary access right corresponding to the content asset; and
in response to receiving the request from the second user device, terminating access to the content asset.

9. The method of claim 1 wherein access to content asset comprises a play back, fast forward, rewind or pause operation.

10. The method of claim 9 wherein a number of times the content asset may be accessed is limited by a temporary access right.

11. The method of claim 1 further comprising playing the content asset on the first device, wherein the content asset is a video, and wherein the amount of time for which access is maintained corresponds to a difference between (1) the length of the content asset and (2) an elapsed amount of time from when playing of the content asset started and when the first user device left the proximity of the second device.

12. A system comprising:
control circuitry configured to:
detect a second user device within a proximity of a first user device, the first user device associated with a first user, and the second user device associated with a second user;
receive input from a first one of the first and second users, with a first one of the first and second devices, that initiates a transfer of content authorization information to a second one of the first and second devices, associated with a second one of the first and second users;
responsive to detecting the second user device and receiving input, receive at the first user device content authorization information, wherein the content authorization information enables access to a content asset on the second user device which the first user device is not authorized to access;
enable access to the content asset on the first user device;
determine that the first user device leaves the proximity of the second user device;
in response to determining that the first user device leaves the proximity, maintain access to the content asset on the first user device for an amount of time determined based on a length of the content asset.

13. The system of claim 12 wherein the predetermined amount of time is a user specified duration or a duration of time required to play back the content asset, and wherein the control circuitry is further configured to:
terminate, in response to determining that the predetermined time has elapsed, access to the content asset on the first user device.

14. The system of claim 12 wherein the proximity is based on a first physical location of the first user device and a second physical location of the second user device determined by a global position system (GPS), cell tower triangulation or a wireless detection range of the first and second user device.

15. The system of claim 12 wherein the proximity is based on connection of the first user device and second user device to an active session of an online social network service.

16. The system of claim 12, further comprising:
a display device;
a user input interface;
wherein the control circuitry is further configured to:
display on the display device, a selectable list of users, including the first user and the second user,
wherein the input is a request from the first user, using the user input interface, to assign a temporary access right to the second user; and
in response to the input from the first user, generate the temporary access right.

17. The system of claim 12, further comprising:
a display device;
a user input interface;
wherein the control circuitry is further configured to:
display on the display device, a selectable list of users, including the first user and the second user,
wherein the input is a request from the first user, using the user input interface, to receive a temporary access right from the second user; and
in response to the input from the first user, receive the content authorization information at the first user device.

18. The system of claim 12 wherein the content authorization information comprises access rights, metadata, user profile information, operation limit information or a hash code.

19. The system of claim 12 wherein the control circuitry is further configured to:
receive from the second user device a request to disable a temporary access right corresponding to the content asset; and
in response to receiving the request from the second user device, terminate access to the content asset.

20. The system of claim 12 wherein access to the content asset comprises a play back, fast forward, rewind or pause operation.

21. The system of claim 20 wherein a number of times the content asset may be accessed is limited by a temporary access right.

22. The system of claim 12, wherein the control circuitry is further configured to play the content asset on the first device, wherein the content asset is a video, and wherein the amount of time for which access is maintained corresponds to a difference between (1) the length of the content asset and (2) an elapsed amount of time from when playing of the content asset started and when the first user device left the proximity of the second device.

\* \* \* \* \*